(12) United States Patent
Han

(10) Patent No.: US 12,079,526 B2
(45) Date of Patent: Sep. 3, 2024

(54) OUTPUT APPARATUS, INFORMATION PROCESSING SYSTEM, OUTPUT METHOD, AND NON-TRANSITORY RECORDING MEDIUM FOR OUTPUTTING RESERVED ELECTRONIC DATA BASED ON SETTING INFORMATION

(71) Applicant: Xiaofeng Han, Kanagawa (JP)

(72) Inventor: Xiaofeng Han, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/300,796

(22) Filed: Apr. 14, 2023

(65) Prior Publication Data

US 2023/0342096 A1    Oct. 26, 2023

(30) Foreign Application Priority Data

Apr. 26, 2022  (JP) ................... 2022-072245
Mar. 15, 2023  (JP) ................... 2023-041290

(51) Int. Cl.
*G06F 3/12* (2006.01)
*G06F 21/44* (2013.01)

(52) U.S. Cl.
CPC .......... *G06F 3/1222* (2013.01); *G06F 3/1204* (2013.01); *G06F 3/1238* (2013.01); *G06F 21/44* (2013.01); *G06F 3/1292* (2013.01)

(58) Field of Classification Search
None
See application file for complete search history.

(56) References Cited

U.S. PATENT DOCUMENTS

| | | | |
|---|---|---|---|
| 2007/0081186 A1* | 4/2007 | Numata | G06F 3/1212 358/1.15 |
| 2011/0235114 A1* | 9/2011 | Saitoh | G06F 3/1261 358/1.15 |
| 2015/0264191 A1 | 9/2015 | Kawano | |
| 2017/0171399 A1 | 6/2017 | Yamada et al. | |
| 2022/0206726 A1 | 6/2022 | Dohmae et al. | |

FOREIGN PATENT DOCUMENTS

| | | |
|---|---|---|
| EP | 3 800 540 | 4/2021 |
| JP | 2015156217 A * | 8/2015 |
| JP | 2017-111799 | 6/2017 |
| JP | 2019133321 A * | 8/2019 |
| JP | 2021-056622 | 4/2021 |
| JP | 2022-102463 | 7/2022 |

OTHER PUBLICATIONS

English translation of JP-2015156217-A (Patents Application 2015-029397). (Year: 2015).*
English translation of JP-2019133321-1A (Patents Application 2018-013796). (Year: 2019).*
Extended European Search Report for 23167773.3 mailed on Sep. 27, 2023.

* cited by examiner

*Primary Examiner* — Thomas D Lee
(74) *Attorney, Agent, or Firm* — IPUSA, PLLC

(57) ABSTRACT

An output apparatus, an information processing system, an output method, and a non-transitory recording medium. The output apparatus receives setting information related to use of the output apparatus from a user terminal of a user and controls based on the setting information, whether to output electronic data received from a service providing system, or to receive list information indicating a list of electronic data from the service providing system and output the electronic data selected from the list information by the user.

10 Claims, 14 Drawing Sheets

FIG. 8

| PRINT JOB ID | TENANT ID | USER ID | FILE NAME | PRINT DATA PATH | PRINT RESERVATION | ... |
|---|---|---|---|---|---|---|
| 000001 | 12345678 | UserA | A.DOC | HTTP://HOST.DOMAIN/FILES/XXX | FALSE | ... |
| 000002 | 12345678 | UserA | B.DOC | HTTP://HOST.DOMAIN/FILES/YYY | FALSE | ... |
| 000003 | 12345678 | UserA | C.DOC | HTTP://HOST.DOMAIN/FILES/ZZZ | FALSE | ... |
| 000004 | 12345678 | UserB | FILE.PDF | HTTP://HOST.DOMAIN/FILES/AAA | FALSE | ... |
| 000005 | 567891234 | UserC | IMAGE.IMG | HTTP://HOST.DOMAIN/FILES/BBB | FALSE | ... |

FIG. 9

| PRINT JOB ID | TENANT ID | USER ID | FILE NAME | PRINT DATA PATH | PRINT RESERVATION | ... |
|---|---|---|---|---|---|---|
| 000001 | 12345678 | UserA | A.DOC | HTTP://HOST.DOMAIN/FILES/XXX | TRUE | ... |
| 000002 | 12345678 | UserA | B.DOC | HTTP://HOST.DOMAIN/FILES/YYY | TRUE | ... |
| 000003 | 12345678 | UserA | C.DOC | HTTP://HOST.DOMAIN/FILES/ZZZ | FALSE | ... |
| 000004 | 12345678 | UserB | FILE.PDF | HTTP://HOST.DOMAIN/FILES/AAA | FALSE | ... |
| 000005 | 567891234 | UserC | IMAGE.IMG | HTTP://HOST.DOMAIN/FILES/BBB | FALSE | ... |

OUTPUT APPARATUS, INFORMATION PROCESSING SYSTEM, OUTPUT METHOD, AND NON-TRANSITORY RECORDING MEDIUM FOR OUTPUTTING RESERVED ELECTRONIC DATA BASED ON SETTING INFORMATION

CROSS-REFERENCE TO RELATED APPLICATIONS

This patent application is based on and claims priority pursuant to 35 U.S.C. § 119(a) to Japanese Patent Application No. 2022-072245, filed on Apr. 26, 2022, and No. 2023-041290 dated Mar. 15, 2023, in the Japan Patent Office, the entire disclosure of which is hereby incorporated by reference herein.

BACKGROUND

Technical Field

The present disclosure relates to an output apparatus, an information processing system, an output method, and a non-transitory recording medium.

Background Art

A known system provides a pull print service (location-free printing, secure printing) in which electronic data is sent from an information processing apparatus operated by a user to an output system on a network, and the user downloads and prints the electronic data stored in the output system from any output apparatus. Also, a technique that allows the user to easily specify the electronic data registered in the output system is known.

According to the disclosed technique, in response to an input into the output apparatus by the user of a temporary code issued by a server for the information processing apparatus, the output apparatus sends the temporary code to the server and prints the electronic data received from the server.

SUMMARY

Embodiments of the present disclosure describe an output apparatus, an information processing system, an output method, and a non-transitory recording medium. The output apparatus receives setting information related to use of the output apparatus from a user terminal of a user and controls based on the setting information, whether to output electronic data received from a service providing system, or to receive list information indicating a list of electronic data from the service providing system and output the electronic data selected from the list information by the user.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 8 is a diagram illustrating an example of a transition of print jobs stored in a print job storage unit;

FIG. 9 is a diagram illustrating another example of the transition of print jobs stored in the print job storage unit;

Figure 1:
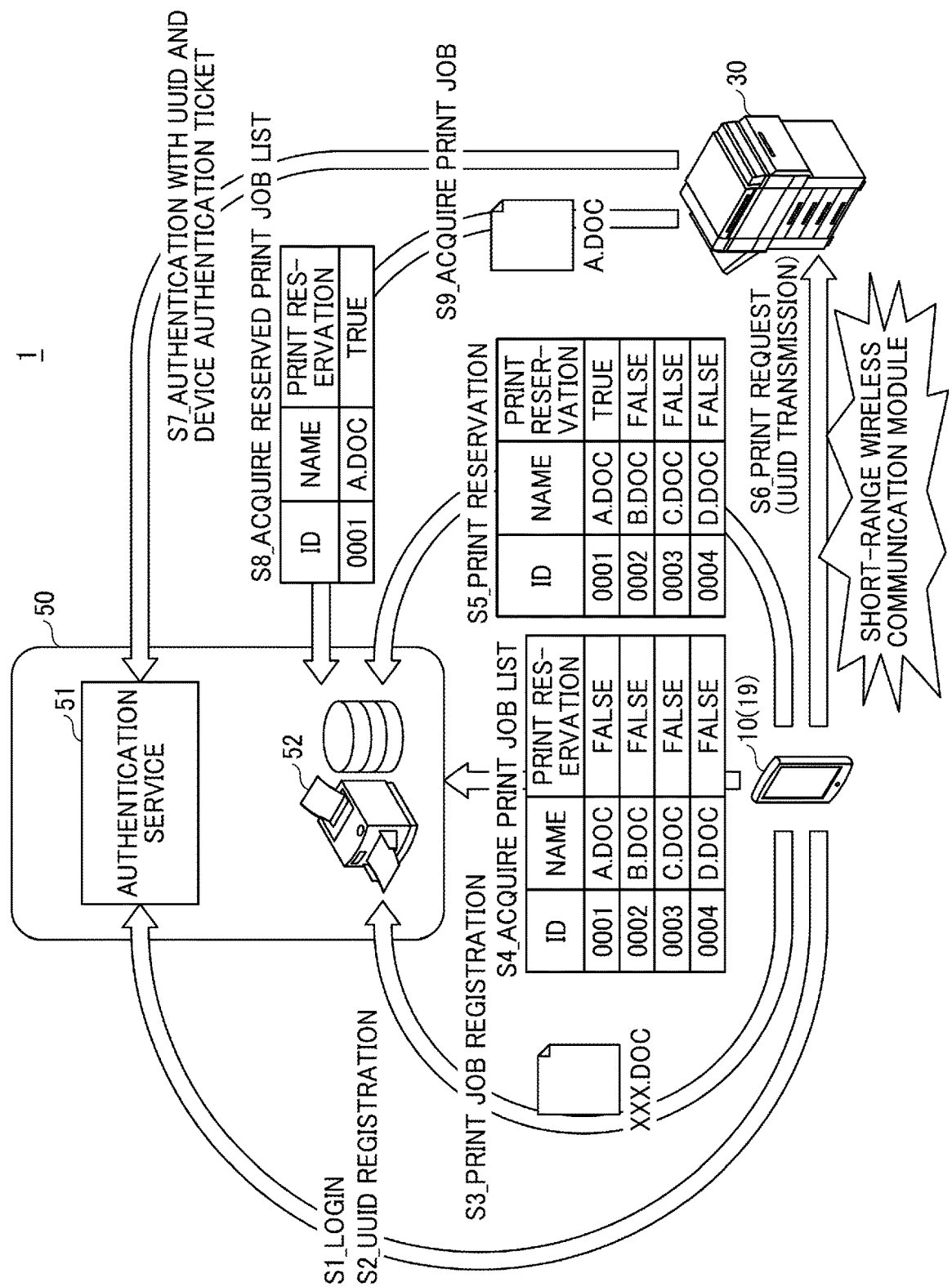
FIG. 1 is a diagram illustrating an example of a general operation of an information processing system according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, a description is given of several embodiments of the present disclosure with reference to the drawings.

Figure 2:
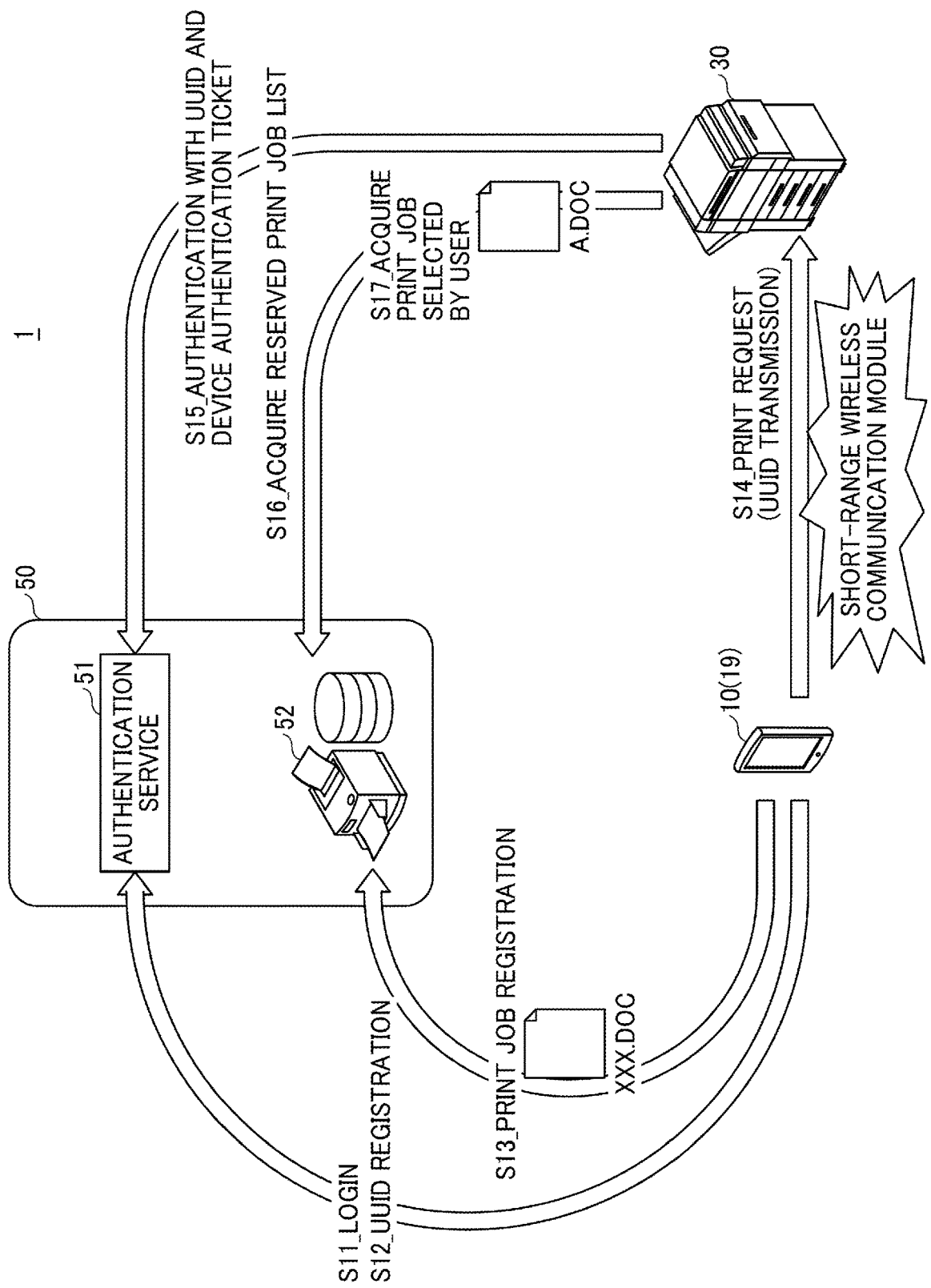
FIG. 2 is a diagram illustrating another example of the general operation of the information processing system according to embodiments of the present disclosure.

FIGS. 1 and 2 are diagrams illustrating examples of a general operation of an information processing system according to the present embodiment.

In step S1, a user inputs a user identifier (ID) and password, which are examples of user identification information, into a client application 19 running on a user terminal 10 to log in to a service providing system 50. The user ID may be an e-mail address or the like. An authentication service 51 operating in the service providing system 50 authenticates the user who operates the user terminal 10.

In step S2, the client application 19 registers a Universally Unique Identifier (UUID) in the service providing system 50 in association with the user ID. The UUID is a 128-bit character string for unique identification on software.

In step S3, the user terminal 10 registers a print job in the service providing system 50. The print job can be registered using either a personal computer (PC) or the user terminal 10 such as a smartphone. The print job is registered in association with the user ID.

In step S4, the client application 19 requests a print job list from a print job management service 52 of the service providing system 50. The print job management service 52 transmits the print job list associated with the user ID to the client application 19.

In step S5, the user selects a print job to be printed from the received print job list. The client application 19 transmits identification information of the print job selected by the user to the print job management service 52. For example, FIG. 1 illustrates a case where a print job "a.doc" is reserved for printing. The print job management service 52 updates a print reservation column of the print job "a.doc" in a print job storage unit, which is described below, from "FALSE" to "TRUE". Since the user makes a print reservation for the print job on the user terminal 10 without touching an output apparatus 30, the number of times the output apparatus 30 is operated is reduced.

In step S6, the user holds the user terminal 10 over a short-range wireless communication module of the output apparatus 30. The client application 19 sends a print request to the output apparatus 30 by transmitting the UUID, an automatic output parameter, and a print job list automatic download parameter. Details of the automatic output parameter and the print job list automatic download parameter are described below.

In step S7, the output apparatus 30 uses the UUID and the device authentication ticket to issue an authentication request to the authentication service 51. The description continues assuming that the authentication is successful. In the case the automatic output parameter is "TRUE", the print job management service 52 transmits to the output apparatus 30, a print job list including print jobs (print jobs designated for print reservation) whose print reservation column is "TRUE" (print jobs designated for print reservation) in step S8. In FIG. 1, the print job management service 52 transmits the print job list including the print job "a.doc" to the output apparatus 30.

In step S9, the output apparatus 30 uses the print job IDs to acquire and print as many print jobs as the number of print jobs in the print job list received in step S8. For example, in FIG. 1, the output apparatus 30 that acquired the print job "a.doc" prints the print job "a.doc". Note that the print job management service 52 changes the print reservation column of the print job for which printing has been completed from "TRUE" to "FALSE".

The information processing system 1 of the present embodiment registers print reservations for print jobs in the service providing system 50 in advance, so that the user can print jobs registered in the service providing system 50 from the output apparatus 30 without touching the output apparatus 30.

FIG. 1 illustrates an example of automatic printing performed by the user holding the user terminal 10 or a recording medium such as an employee ID card over a short-range wireless communication module of the output apparatus 30, transmitting the UUID to the output apparatus 30, and executing the print job designated for print reservation.

FIG. 2 illustrates an example of the user holding the user terminal 10 or the recording medium such as the employee ID card over the short-range wireless communication module of the output apparatus 30, transmits the UUID to the output apparatus 30, acquires a list of print jobs associated with the user, and printing a print job manually selected by the user from the print job list. Note that description of the same processing as in FIG. 1 is omitted as appropriate.

In step S11, the user inputs the user ID and password, which are examples of user identification information, into the client application 19 running on the user terminal 10 to log in to the service providing system 50. The authentication service 51 operating in the service providing system 50 authenticates the user who operates the user terminal 10.

In step S12, the client application 19 registers the UUID in the service providing system 50 in association with the user ID. In step S13, the user terminal 10 registers the print job in the service providing system 50.

In step S14, the user holds the user terminal 10 over the short-range wireless communication module of the output apparatus 30. The client application 19 sends a print request to the output apparatus 30 by transmitting the UUID, the automatic output parameter, and the print job list automatic download parameter.

In step S15, the output apparatus 30 uses the UUID and the device authentication ticket to issue the authentication request to the authentication service 51. The description continues assuming that the authentication is successful. In the case the automatic output parameter is "FALSE", the print job management service 52 transmits the user's print job list associated with the UUID to the output apparatus 30 in step S16. The print job list may be sent from the print job management service 52 to the output apparatus 30 before or after a print application installed in the output apparatus 30 is started. The print application is an example of an output application.

In step S17, the output apparatus 30 acquires the print job using the print job ID of the print job selected by the user from the print job list received in step S16, and prints the print job.

In the information processing system 1 of the present embodiment, the output apparatus 30 receives a print job list registered in advance in the service providing system 50, and the print job selected by the user from the print job list is printed from the output apparatus 30.

A "print job" is an example of electronic data associated with a user. The electronic data may be any data to be processed by an output apparatus 30. The electronic data is the print job, file, print data, or the like.

The print job is an execution unit of data for the output apparatus 30 to print document data requested to be printed. The print job includes at least document data and may also include print settings. The print job is, for example, a job processed by an image forming apparatus. In the case the output apparatus 30 is a device other than the image forming apparatus, a job is named according to a function of the device. The document data includes characters, images, graphics, images, and the like.

The "UUID" is information for identifying a user who operates the user terminal 10. The information for identifying the user who operates the user terminal 10 includes an integrated circuit (IC) card number of the recording medium possessed by the user such as the employee ID card, a Media Access Control (MAC) address of the user terminal 10, a fixed Internet Protocol (IP) address, Subscriber Identity Module (SIM) card information, a manufacturing number, a serial number, or the like.

An "authentication token" is user authorization information. The authentication token is associated with authority information of the logged-in user. The authentication token may include the authorization information of the logged-in user. The authentication token may include the identification information of the user.

Figure 3:
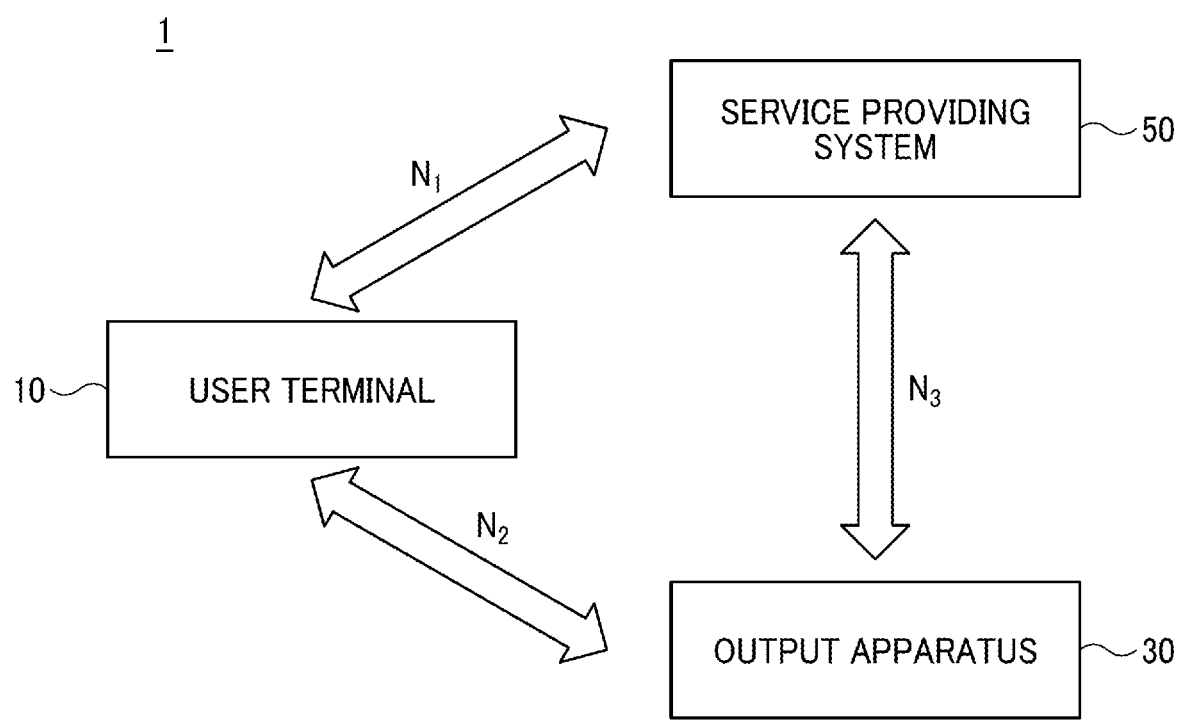
FIG. 3 is a diagram illustrating a system configuration of an example of the information processing system according to embodiments of the present disclosure.

FIG. 3 is a diagram illustrating a system configuration of an example of the information processing system according to the present embodiment. The information processing system 1 includes the user terminal 10, the service providing system 50 and the output apparatus 30.

In FIG. 3, the user terminal 10 and the service providing system 50 communicate through a network N1. The network N1 is a network using public lines such as 3G, 4G, 5G, and Long Term Evolution (LTE). The public line is a line that is physically shared by unspecified users, and includes, for example, a mobile telephone network or a personal handyphone system (PHS) communication network. The user terminal 10 may connect to an access point through a wireless local area network (LAN) and communicate with the service providing system 50 through the internet, or may communicate through wire.

The user terminal 10 and the output apparatus 30 communicate through a network N2. The network N2 is a network using near field communication such as Near Field Communication (NFC), BLUETOOTH (registered trademark), or BLUETOOTH LOW ENERGY. Note that the network N2 may be a network for communication of relatively short range such as infrared communication or visible light communication.

The output apparatus 30 and the service providing system 50 communicate through a network N3. Examples of the network N3 includes the LAN built in a facility where the output apparatus 30 and the service providing system 50 are installed, a wide area network (WAN) having a plurality of LANs, or the internet. The network N3 is able to allow the output apparatus 30 and the service providing system 50 to communicate with each other. The network N3 is any one of a wired network, a wireless network, and a combination of the wired network and the wireless network. Further, the output apparatus 30 may connect to a public line and communicate with the service providing system 50.

The user terminal 10 includes functions of a computer. A client application is running on the user terminal 10. The client application includes functions of registering the print job in the service providing system 50 and acquiring and displaying the print job list. Further, the user terminal 10 may include a function of editing or deleting the print job.

Note that the user terminal 10 may be running a general application that supports creation of document data or acquisition of document data from the internet. Further, the client application running on the user terminal 10 includes a function of causing the output apparatus 30 to print the print job stored in the service providing system 50.

Specific examples of the user terminal 10 includes, but not limited to, a smartphone, a mobile phone, a tablet terminal, a game machine, a personal digital assistant (PDA), a digital camera, a wearable PC, a PC, and the like.

The service providing system 50 is implemented by, for example, one or more information processing apparatuses on the internet. The one or more information processing apparatuses on the network are sometimes called servers. The server implements a function of providing information and processing results in response to a request from a client through the cooperation of the computer and software.

The service providing system 50 accumulates print jobs received from the user terminal 10 and transmits the print jobs to the output apparatus 30 in response to a request from the output apparatus 30. The service providing system 50 includes one or more information processing apparatuses. The service providing system 50 may reside on the internet or may reside on-premises. The service providing system 50 residing on the internet may support cloud computing. A "cloud" is a term used when a particular hardware resource is not intended. The service providing system 50 may be called a cloud system, a server system, or the like.

The service providing system 50 includes storage for storing the print jobs. The storage may be storage used in services for providing users with disk space on the internet. The service providing system 50 may be called online storage. The service providing system 50 can be used by both general users and companies. The companies are not obliged to build a file server environment by using the online storage, and is able to increase or decrease capacity as appropriate.

The output apparatus 30 is a printer, an image forming apparatus, an image processing apparatus, a copier, a multi-function peripheral (MFP), or the like that executes the print job. The output apparatus 30 according to the present embodiment includes a printer function. Further, the output apparatus 30 may be a device including an output function other than a print function. The output apparatus 30 is, for example, a projector, a head up display (HUD) device, an electronic whiteboard, or a digital signage. The output apparatus 30 outputs (prints, displays, reproduces, etc.) data such as images, documents, and music acquired from the service providing system 50 according to a job such as a print job.

The output apparatus 30 includes, for example, an industrial machine, an imaging device, a sound collecting device, a medical device, a network home appliance, a car (connected car), a notebook PC, the mobile phone, the smartphone, the tablet terminal, the game machine, the PDA, a digital camera, a wearable PC, a desktop PC, or the like.

Figure 4:
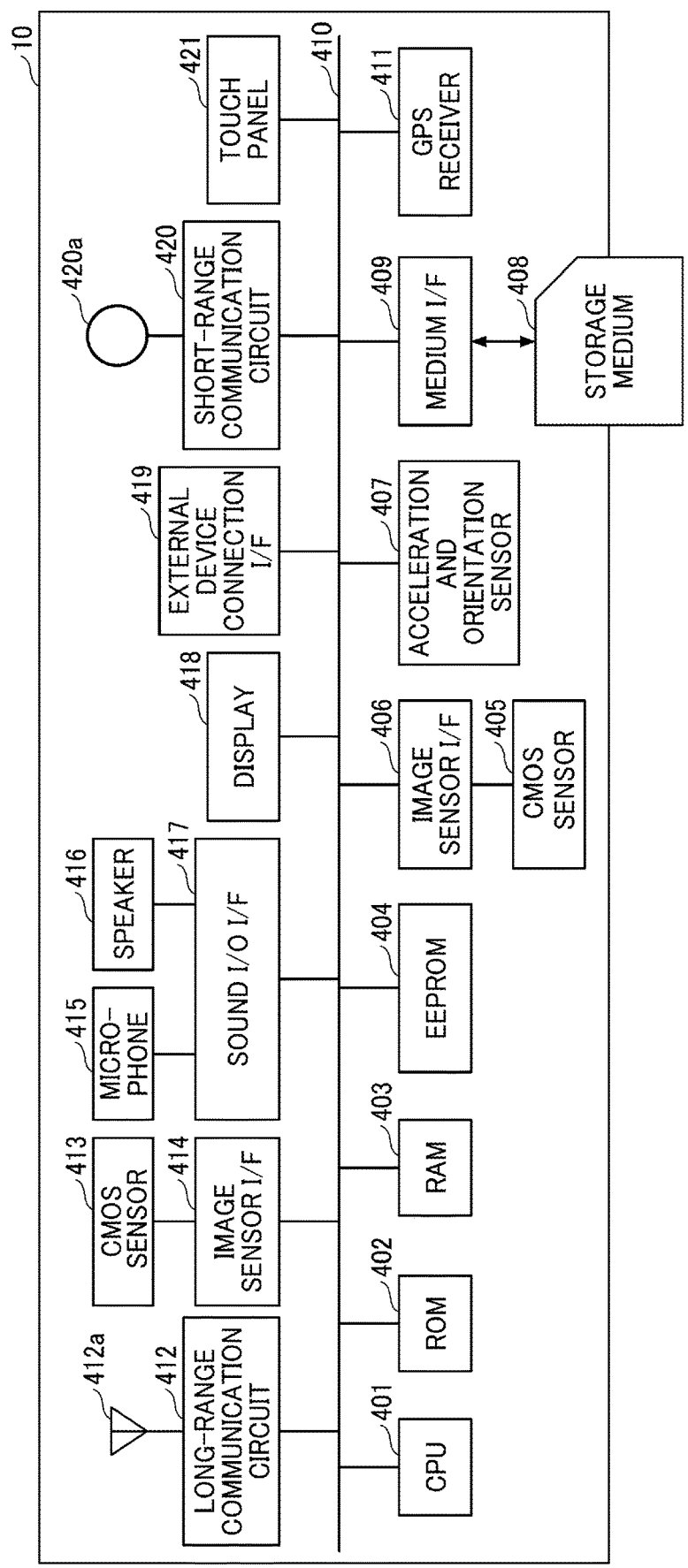
FIG. 4 is a block diagram illustrating a hardware configuration of an example of a user terminal.

FIG. 4 is a block diagram illustrating a hardware configuration of an example of the user terminal. The user terminal 10 includes a central processing unit (CPU) 401, a read only memory (ROM) 402, a random access memory (RAM) 403, an electrically erasable and programmable ROM (EEPROM) 404, a complementary metal oxide semiconductor (CMOS) sensor 405, an image sensor interface (I/F) 406, an acceleration and orientation sensor 407, a medium I/F 409 and a Global Positioning System (GPS) receiver 411.

The CPU 401 controls the operation of the user terminal 10 as a whole. The ROM 402 stores programs including an initial program loader (IPL) to boot the CPU 401. The RAM 403 is used as a work area for the CPU 401. The EEPROM 404 reads or writes various data such as a program (application) for the user terminal 10 under the control of the CPU 401.

The CMOS sensor 405 is an example of a built-in imaging device that captures an object (mainly, a self-image of a user) under the control of the CPU 401 to obtain image data such as a photograph. The CMOS sensor may be an imaging device such as a charge coupled device (CCD) sensor. The image sensor I/F 406 is a circuit for controlling a drive of the CMOS sensor 405. The acceleration and orientation sensor 407 includes various sensors such as an electromagnetic compass for detecting geomagnetism, a gyrocompass, and an acceleration sensor.

The medium I/F 409 controls reading or writing (storage) of data from or to a storage medium 408 such as a flash memory. The GPS receiver 411 receives a GPS signal from a GPS satellite.

In addition, the user terminal 10 includes a long-range communication circuit 412, a CMOS sensor 413, an image sensor I/F 414, a microphone 415, a speaker 416, a sound input/output (I/O) I/F 417, a display 418, an external device connection I/F 419, a short-range communication circuit 420, an antenna 420a of the short-range communication circuit 420, and a touch panel 421.

The long-range communication circuit 412 is a circuit for communicating with other devices through the network N1. The CMOS sensor 413 is a built-in imaging element for capturing an image of a subject and obtaining image data such as a photograph under the control of the CPU 401. The image sensor I/F 414 is a circuit for controlling drive of the CMOS sensor 413.

The microphone 415 is a built-in circuit that converts a sound into an electric signal. The speaker 416 is a built-in circuit that generates the sound such as music or voice by converting an electric signal into physical vibration. The sound I/O I/F 417 is a circuit that processes sound signal input and output between the microphone 415 and the speaker 416 under the control of the CPU 401. The display 418 is an example of a display device that displays an image of object, various icons, etc. Examples of the display 418 include a liquid crystal display (LCD) and an organic electroluminescence (EL) display. The external device connection I/F 419 is an interface for connecting various external devices.

The short-range communication circuit 420 is a communication circuit that communicates in compliance with the Near Field Communication (NFC), the BLUETOOTH and the like. The touch panel 421 is an example of an input device that allows a user to operate the user terminal 10 by touching a screen of the display 418.

The user terminal 10 further includes a bus line 410. The bus line 410 is an address bus or a data bus, which electrically connects the elements in FIG. 4 such as the CPU 401.

Figure 5:
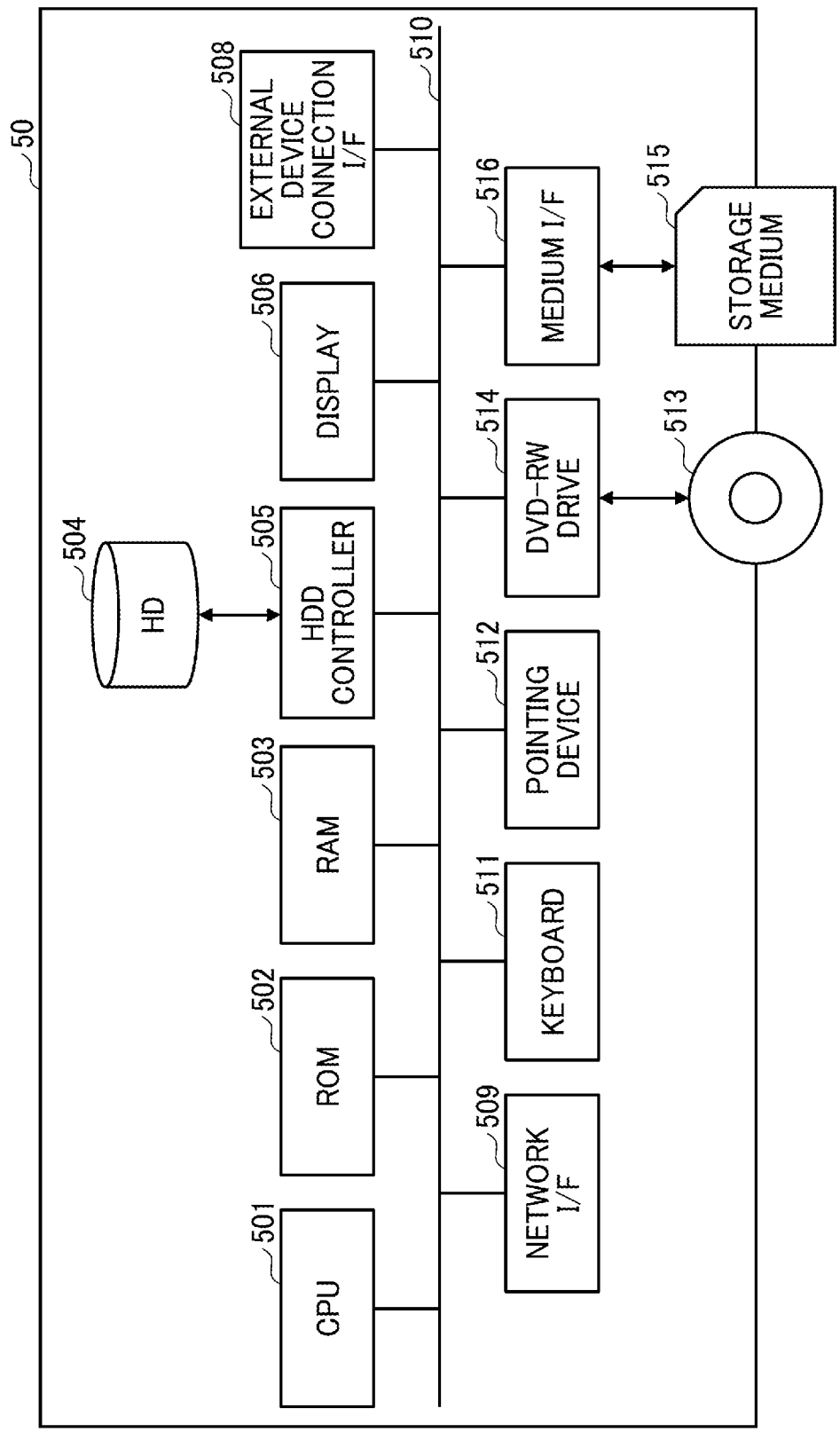
FIG. 5 is a block diagram illustrating a hardware configuration of an example of a service providing system.

FIG. 5 is a block diagram illustrating a hardware configuration of an example of the service providing system. FIG. 5 illustrates an example of the service providing system 50 implemented by the computer. The service providing system 50 of FIG. 5 includes a CPU 501, a ROM 502, a RAM 503, a hard disk (HD) 504, a Hard Disk Drive (HDD) controller 505, a display 506, an external device connection I/F 508, a network I/F 509, a bus line 510, a keyboard 511, a pointing device 512, a Digital Versatile Disk Rewritable (DVD-RW) drive 514, and a medium I/F 516.

The CPU 501 controls operation of the service providing system 50 as a whole. The ROM 502 stores a control program such as the IPL to boot the CPU 501. The RAM 503 is used as a work area for the CPU 501. The HD 504 stores various data such as programs. The HDD controller 505 controls reading and writing of various data from and to the HD 504 under control of the CPU 501.

The display 506 displays various information such as a cursor, menu, window, character, or image. The external device connection I/F 508 is an interface for connecting various external devices. The external device is, for example, a Universal Serial Bus (USB) memory or a printer. The network I/F 509 is an interface for performing data communication using the network N1 or the network N3. The bus line 510 is an address bus, a data bus, or the like for electrically connecting each component such as the CPU 501 illustrated in FIG. 5.

The keyboard 511 is an example of an input device provided with a plurality of keys for allowing the user to input characters, numerals, or various instructions. The pointing device 512 is an example of the input device that allows a user to select or execute a specific instruction, select a target for processing, or move a cursor being displayed. The DVD-RW drive 514 reads and writes various data from and to a DVD-RW 513, which is an example of a removable storage medium. The DVD-RW may be an optical storage medium such as a digital versatile disc-recordable (DVD-R) or the like. The medium I/F 516 controls reading and writing (storing) of data from and to a storage medium 515 such as the flash memory.

Figure 6:
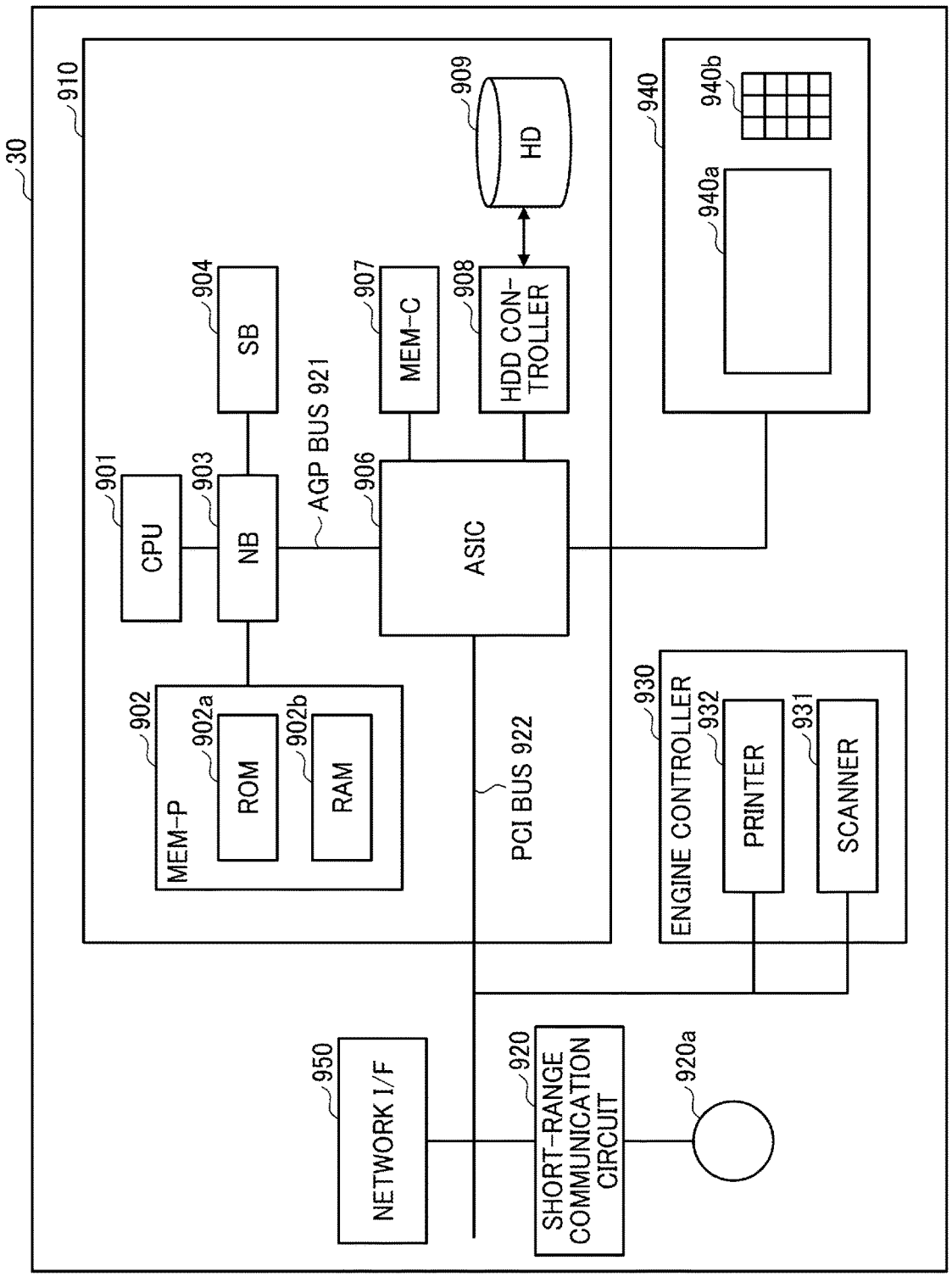
FIG. 6 is a block diagram illustrating a hardware configuration of an example of an output apparatus.

FIG. 6 is a hardware configuration diagram of an example of the output apparatus. FIG. 6 illustrates the hardware configuration of the image forming apparatus, which is an example of the output apparatus 30. The output apparatus 30 of FIG. 6 includes a controller 910, a short-range communication circuit 920, an engine controller 930, a control panel 940 and a network I/F 950.

The controller 910 of FIG. 6 includes a CPU 901 as a main processor, a system memory (MEM-P) 902, a north bridge (NB) 903, a south bridge (SB) 904, an Application Specific Integrated Circuit (ASIC) 906, a local memory (MEM-C) 907 as a storage unit, an HDD controller 908, and an HD 909 as a storage unit. The NB 903 and the ASIC 906 are connected through an Accelerated Graphics Port (AGP) bus 921.

The CPU 901 is a control unit that performs overall control of the output apparatus 30. The NB 903 is a bridge for connecting the CPU 901, the MEM-P 902, the SB 904, and the AGP bus 921. The NB 903 includes a memory controller that controls reading and writing from and to the MEM-P 902, a Peripheral Component Interconnect (PCI) master, and an AGP target.

The MEM-P 902 includes a ROM 902a, which is a memory for storing programs and data for implementing each function of the controller 910, and a RAM 902b, which is used as a drawing memory for developing programs and data for memory printing. The program stored in the ROM 902a may be stored in any computer-readable storage medium, such as a compact disc-read only memory (CD-ROM), compact disc-recordable (CD-R), or digital versatile disc (DVD), in a file format installable or executable by the computer, for distribution.

The SB 904 is a bridge for connecting the NB 903 with a PCI device or a peripheral device. The ASIC 906 is an IC dedicated to an image processing use, and connects the AGP bus 921, a PCI bus 922, the HDD controller 908, and the MEM-C 907 as a bridge.

The ASIC 906 includes a PCI target, an AGP master, an arbiter (ARB) as a central processor of the ASIC 906, a memory controller for controlling the MEM-C 907, a plurality of direct memory access controllers (DMACs) capable of converting coordinates of image data with a hardware logic, and a PCI unit that transfers data between a scanner 931 and a printer 932 through the PCI bus 922.

The ASIC 906 may be connected to a USB interface, or an Institute of Electrical and Electronics Engineers 1394 (IEEE1394) interface. The MEM-C 907 is a local memory used as a buffer for image data to be copied or a code buffer.

The HD 909 is a storage for accumulating image data, accumulating font data used for printing, and accumulating forms. The HDD controller 908 controls reading or writing of data from and to the HD 909 according to the control of the CPU 901.

The AGP bus 921 is a bus interface for a graphics accelerator card, which has been proposed to accelerate graphics processing. Through directly accessing the MEM-P 902 by high-throughput, speed of the graphics accelerator card is improved. The short-range communication circuit 920 is provided with a short-range communication circuit antenna 920a. The short-range communication circuit 920 communicates in compliance with, for example, the NFC or the BLUETOOTH.

The engine controller 930 includes a scanner 931 and a printer 932. The control panel 940 includes a display panel 940a and hard keys 940b. The display panel 940a is a touch panel or the like for displaying current setting values, selection screens, and the like, and receives inputs from the user. The hard key 940b is a numeric keypad for receiving setting values of conditions related to image formation such as density setting conditions, a start key for receiving a copy start instruction, and the like.

The controller 910 controls all operations of the output apparatus 30, for example, drawing, communication, or user input to the control panel 940. The scanner 931 or the printer 932 includes image processing functions such as error diffusion processing and gamma conversion processing.

In response to an instruction to select a specific application through the control panel 940, for example, using a mode switch key, the output apparatus 30 selectively performs a document box function, a copy function, a print function, and a facsimile function. In the output apparatus 30, the document box mode is selected when the document box function is selected, the copy mode is selected when the copy function is selected, the print mode is selected when the print function is selected, and the facsimile mode is selected when the facsimile function is selected.

The network I/F 950 is an interface for performing data communication using the network N3. The short-range communication circuit 920 and the network I/F 950 are electrically connected to the ASIC 906 through the PCI bus 922.

Figure 7:
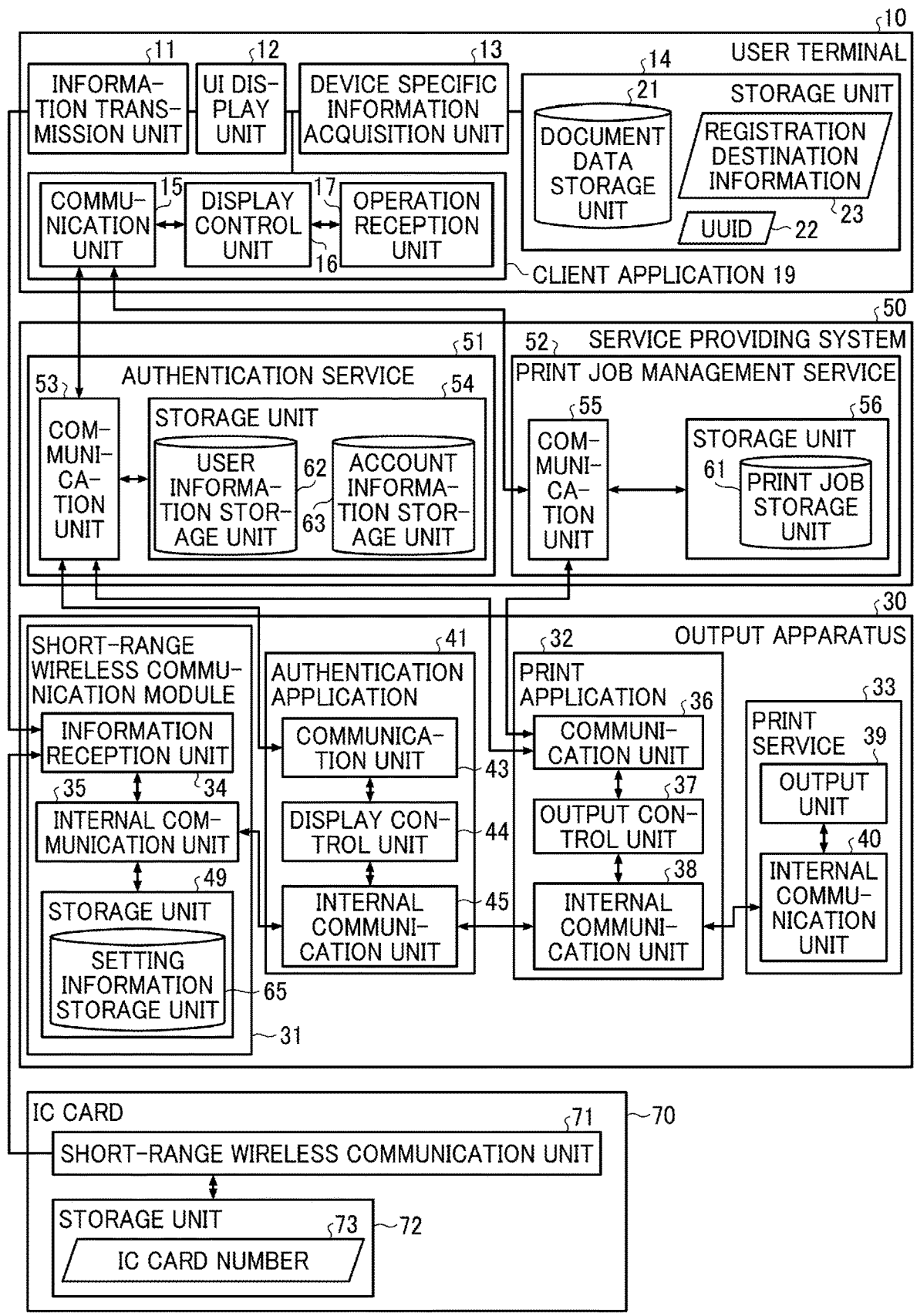
FIG. 7 is a block diagram illustrating a functional configuration of an example of the information processing system according to embodiments of the present disclosure.

FIG. 7 is a block diagram illustrating a functional configuration of an example of the information processing system according to the present embodiment.

The user terminal 10 includes an information transmission unit 11, a user interface (UI) display unit 12, a device specific information acquisition unit 13, a storage unit 14, a communication unit 15, a display control unit 16 and an operation reception unit 17. The communication unit 15, the display control unit 16, and the operation reception unit 17 are implemented by operating any of the components illustrated in FIG. 4 in response to a command from the CPU 401 according to the client application 19 deployed from the EEPROM 404 to the RAM 403. Each of the other functional units is implemented by operating any of the components illustrated in FIG. 4 in response to a command from the CPU 401 according to a program (native application, web browser, etc.) deployed from the EEPROM 404 to the RAM 403.

The communication unit 15 connects to the network N1 and uses the registration destination information 23 stored in the storage unit 14 to communicate with the service providing system 50. The registration destination information 23 is information indicating a registration destination of the print job. The communication unit 15 transmits the print job to the service providing system 50. Further, the communication unit 15 receives the print job list from the service providing system 50.

The display control unit 16 generates a screen including a UI and displays the screen on the display 418. The display control unit 16 generates the screen by arranging information acquired from the service providing system 50 in layout components predetermined by the client application 19.

The operation reception unit 17 receives various operations on the user terminal 10. The operation reception unit 17 receives instructions from the user, such as selection of document data to be registered as the print job and print reservation of the print job.

The information transmission unit 11 communicates with the output apparatus 30 by short-range wireless communication. The user may cause the output apparatus 30 to read a bar code or two-dimensional code and transmit the information. The UI display unit 12 displays the UI of the user terminal 10. The UI display unit 12 displays the UIs other than the client application 19. The UI display unit 12 receives user operations from, for example, the touch panel.

The device specific information acquisition unit 13 acquires information specific to the user terminal 10 or client application 19. In the present embodiment, the UUID 22 as an example of the information specific to the user terminal 10 or the client application 19 is used in the description, but in the case the user terminal 10 includes an IC card, an IC card number may be used instead of the UUID 22, or both the UUID 22 and the IC card number may be used.

Further, the user terminal 10 includes a storage unit 14 implemented by one or more of the EEPROM 404, RAM 403, and ROM 402 illustrated in FIG. 4. A document data storage unit 21 is implemented in the storage unit 14. The UUID 22 and the registration destination information 23 are stored in the storage unit 14.

The document data storage unit 21 stores document data generated by the user or document data obtained from the internet or the like. The document data storage unit 21 may reside on the network. The user operates the user terminal 10 to register the print job of the selected document data in the service providing system 50.

The UUID 22 and the registration destination information 23 are described with reference to Tables 1 and 2.

TABLE 1

UUID
a0a0a0a0-b1b1-c2c2-d3d3-e4e4e4f5f5f5

Table 1 illustrates an example of the UUID 22. The UUID 22 is identification information of the user terminal 10 or client application 19. In the case the user terminal 10 is dedicated to a user, the UUID 22 identifies the user. The UUID 22 should be unique and may be biometric authentication information such as a fingerprint of the user. Note that the UUID 22 is not changed at least frequently.

Further, instead of the UUID 22, a MAC address, fixed IP address, SIM card information, production number, serial number, or the like may be used. The UUID 22 may be a unique number or the like for the user terminal 10 or the client application 19.

TABLE 2

| Service Providing System ID | 12345 |
|---|---|
| URL | https:// . . . |
| User Name | ichiro |
| Password | ******* |

Table 2 illustrates an example of the registration destination information 23. The registration destination information 23 is information including the registration destination of the print job. The registration destination information 23 in Table 2 includes a service providing system ID, uniform resource locator (URL), user name, and password. The service providing system ID is information for identifying the service providing system 50. The service providing system ID may be information for uniquely identifying the service providing system 50. An ID is a name, a code, a character string, a numerical value, or a combination thereof used to uniquely distinguish a specific object from a plurality of objects. The ID may be called identification information.

The URL is information indicating location and communication method of resources such as files and services that is accessible on the network. Note that the URL may include address information indicating the location of the resource. In the present embodiment, the address of the service providing system 50 is included. The user name and password are examples of login information for the user to log into the service providing system 50, but the login information may not be included.

The service providing system 50 includes an authentication service 51 and a print job management service 52. The authentication service 51 includes a communication unit 53 and a storage unit 54. The print job management service 52 includes a communication unit 55 and a storage unit 56. A service provides a user with certain information processing. The service is provided with a function according to the contents.

The authentication service 51 performs authentication such as user authentication and authority authorization based on the user information stored in the user information storage unit 62 and transmits the authentication result to the user terminal 10 or the output apparatus 30. The authentication indicates determining whether a user is a legitimate authority. In the present embodiment, the authentication indicates determining whether the user is authorized to use the service providing system 50. The authority authorization is to give the user the authority to perform operations (print job list display, printing, editing, etc.) that the user is allowed to perform.

In addition, the authentication service 51 may execute device authentication. The device authentication indicates authenticating whether an output apparatus 30 is a legitimate device. A device authentication ticket is used for the device authentication. The output apparatus 30 stores the device authentication ticket in advance. The device authentication ticket is information indicating that the device is authenticated. The device authentication ticket is stored in the output apparatus 30 in response to an administrator, a customer engineer, or the like operating the output apparatus 30 to input authentication information distributed by a seller, and the authentication service 51 determining that the authentication is successful. Accordingly, the user is not allowed to print the print job registered in the service providing system 50 from the output apparatus 30 that does not have the device authentication ticket.

The authentication service 51 also manages association between the UUID and user ID in the account information storage unit 63. The authentication service 51 identifies the user ID associated with the UUID sent from the output apparatus 30.

The authentication service 51 is a function implemented by operating any of the components illustrated in FIG. 5 by an instruction from the CPU 501 according to the program of the authentication service 51 deployed from the HD 504 to the RAM 503.

The communication unit 53 of the authentication service 51 connects to the network N1 or N3 and transmits and receives various data to and from the user terminal 10 and the output apparatus 30. The communication unit 53 of the present embodiment, for example, receives the UUID or the like from the output apparatus 30 and returns the authentication result.

The authentication service 51 also includes a storage unit 54 implemented by one or more of the HD 504, RAM 503, and ROM 502 illustrated in FIG. 5. The user information storage unit 62 and the account information storage unit 63 are implemented in the storage unit 54.

TABLE 3

| User ID | UserA |
|---|---|
| Password | ***** |
| Email Address | usera@sample.com |
| Authentication Token | 1234567890 |
| . . . | . . . |

Table 3 schematically illustrates the user information stored in the user information storage unit 62. Information such as the user ID, password, email address, and authentication token are registered as the user information. The user ID is identification information identifying a user. The password is usually confidential information that proves the identity of the user. The email address is the user's email address, which is unique and can be used for authentication. The authentication token is alternative information for the user ID generated upon successful authentication.

TABLE 4

| | On-Premises Account | |
|---|---|---|
| User ID | On-Premises ID | Type of On-Premises ID |
| User0001 | A12345 | Pc_id |
| | a0a0a0a0-b1b1-c2c2-d3d3-e4e4e4f5f5f5 | Phone_id |

Table 4 illustrates an example of account information stored in the account information storage unit 63. The account information associates the user ID with an on-premises ID. The on-premises ID is an example of identification information on the on-premises environment. The on-premises ID is identification information of the user terminal used by the user on the on-premises environment. Accordingly, the on-premises ID is identification information of the user terminal 10 or the client application 19, for example. Further, the type of on-premises ID (for example, for PC, for smartphone, etc.) is registered in the on-premises ID.

The print job management service 52 is a function implemented by operating any of the components illustrated in FIG. 5 by an instruction from the CPU 501 according to the program of the print job management service 52 deployed from the HD 504 to the RAM 503.

The print job management service 52 receives the print job from the user terminal 10 and returns the print job list in response to a request from the output apparatus 30. The client that receives the print job list in the present embodiment includes the client application 19, Web UI, mail, port monitor (a module that transmits an output of a printer driver), and the like.

The print job management service 52 stores the print job received by the communication unit 55 in the print job storage unit 61. The print job management service 52 assigns a print job ID and stores the print job in association with the print ID, user ID, and file name.

The communication unit 55 of the print job management service 52 connects to the network N1 or N3 to transmit and receive various data to and from the user terminal 10 and the output apparatus 30. The communication unit 55 of the print job management service 52 of the present embodiment receives the print job from the user terminal 10 and transmits the print job to the output apparatus 30.

In response to receiving a request for the print job list designating the UUID from the output apparatus 30, the print job management service 52 acquires the user ID associated with the UUID from the authentication service 51. Then, the print job list of print jobs associated with the user ID is obtained from the print job storage unit 61 and transmitted to the output apparatus 30.

The print job management service 52 includes a storage unit 56 implemented by one or more of the HD 504, RAM 503, and ROM 502 illustrated in FIG. 5. A print job storage unit 61 is implemented in the storage unit 56.

TABLE 5

| Print Job ID | Tenant ID | User ID | File Name | Print Data Path | Print Reservation | ... |
|---|---|---|---|---|---|---|
| 00001 | 12345678 | UserA | a.doc | http://host.domain/files/xxx | false | ... |
| 00002 | 12345678 | UserA | b.doc | http://host.domain/files/yyy | false | ... |
| 00003 | 12345678 | UserA | c.doc | http://host.domain/files/zzz | false | ... |
| 00004 | 12345678 | UserB | Files.pdf | http://host.domain/files/aaa | false | ... |
| 00005 | 12345678 | UserC | Image.img | http://host.domain/files/bbb | false | ... |

Table 5 schematically illustrates print job information stored in the print job storage unit 61. The print job ID, tenant ID, user ID, file name, print data path, and print reservation are registered in the print job information.

The print job ID is print job identification information assigned for each print job by the service providing system 50. The tenant ID is identification information of a tenant (company, organization, department, group, etc.) to which the user belongs. The user ID is identification information of the user who has submitted the job. The file name is the file name of document data to be printed. The print data path indicates a location (address on the network) where the print job (file) is stored. The print data path is, for example, a file path. The document data to be printed may be stored in the print job storage unit 61.

Further, the output apparatus 30 includes a short-range wireless communication module 31, an authentication application 41, a print application 32, and a print service 33. Note that a module is equivalent to an application or a program.

The information reception unit 34 and the internal communication unit 35 included in the short-range wireless communication module 31 are implemented by operating any of the components illustrated in FIG. 6 in response to an instruction from the CPU 901 according to the short-range wireless communication module 31 developed from the HD 905 to the RAM 902b.

The communication unit 43, the display control unit 44, and the internal communication unit 45 of the authentication application 41 are implemented by operating any of the components illustrated in FIG. 6 in response to an instruction from the CPU 901 according to the authentication application 41 deployed from the HD 905 to the RAM 902b.

The communication unit 36, the output control unit 37, and the internal communication unit 38 of the print application 32 are implemented by operating any of the components illustrated in FIG. 6 in response to an instruction from the CPU 901 according to the print application 32 deployed from the HD 905 to the RAM 902b. The output control unit 37 controls whether to print the print job registered in the service providing system 50 by the operation illustrated in FIG. 1 or by the operation illustrated in FIG. 2 based on the automatic output parameter and the print job list automatic download parameter as described below.

The output unit 39 and the internal communication unit 40 of the print service 33 are implemented by operating any of the components illustrated in FIG. 6 in response to an instruction from the CPU 901 according to the print service 33 deployed from the HD 905 to the RAM 902b. The output unit 39 executes the print job received by the print application 32.

The information reception unit 34 connects to the network N2 and communicates with the user terminal 10 by the short-range wireless communication. For example, the information reception unit 34 periodically transmits a radio wave indicating presence to the surroundings, detects the radio wave from the user terminal 10 that has approached the range of radio wave, and automatically establishes communication with the user terminal 10. In the present embodiment, the information reception unit 34 receives the UUID from the user terminal 10.

An IC card 70 includes a short-range wireless communication unit 71 and a storage unit 72. The short-range wireless communication unit 71 communicates with the output apparatus 30 by, for example, the NFC. The storage unit 72 stores an IC card number 73.

The internal communication unit 35 performs inter-process communication with the authentication application 41, the print application 32, and the print service 33. The internal communication unit 35 transmits the UUID to the internal communication unit 45 of the authentication application 41.

In response to a detection of the user terminal 10 or the IC card 70 by the short-range wireless communication module 31, the authentication application 41 uses the UUID received by the short-range wireless communication module 31 to request authentication from the service providing system 50. Based on a successful authentication, the authentication application 41 receives an authentication token or the like from the service providing system 50 and permits use of the output apparatus 30.

The internal communication unit 45 of the authentication application 41 receives the UUID from the internal communication unit 35 of the short-range wireless communication module 31. The communication unit 43 transmits the UUID and the device authentication ticket to the service providing system 50, and receives the authentication token in response to a successful authentication. In the case the authentication fails, the display control unit 44 displays an account information input screen.

The output control unit 37 of the print application 32 receives a print job registered in the service providing system 50 from the service providing system 50 according to the operation illustrated in FIG. 1 or the operation illustrated in FIG. 2. The output unit 39 of the print service 33 receives the print job received by the print application 32 and executes the print job. That is, the output unit 39 executes printing.

FIGS. 8 and 9 are diagrams illustrating examples of transition of print jobs stored in the print job storage unit.

FIG. 8 is a table illustrating an example of the print job storage unit 61 without any reserved print job stored. In FIG. 8, "FALSE" is stored for the print reservation of all print jobs. A print job with print reservation "FALSE" indicates that no print reservation has been made.

FIG. 9 is a table illustrating an example of the print job storage unit 61 with two print jobs reserved for printing. In FIG. 9, "TRUE" is stored for print reservation of the print jobs with file names "A.DOC" and "B.DOC". A print job with print reservation "TRUE" indicates that the print job is reserved for printing.

The print job reserved for printing according to the operation illustrated in FIG. 1 is the print job to be printed by the automatic printing that enables printing by the user holding the user terminal 10 or the IC card 70 over the output apparatus 30 (touchless). The print reservation stored in the print job storage unit may be automatically changed from "TRUE" to "FALSE" after printing is completed, or may be manually changed by the user.

Figure 10:
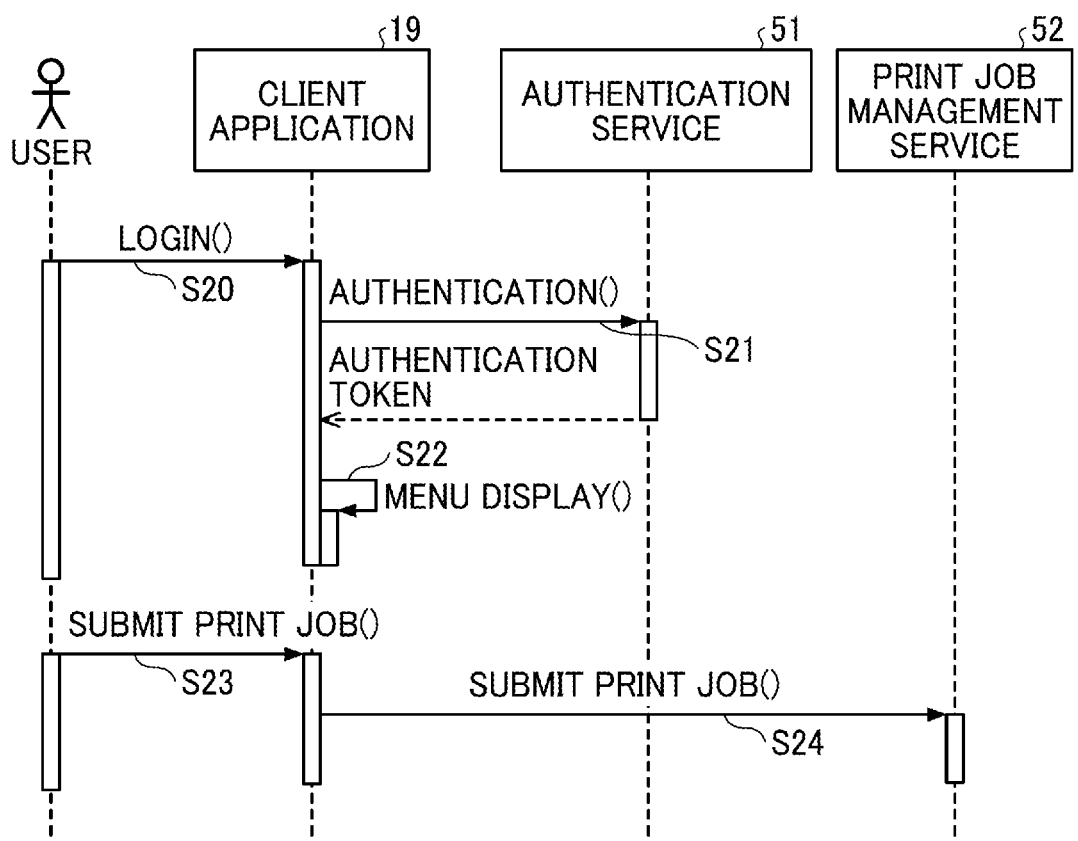
FIG. 10 is a sequence diagram illustrating an example of a process for registering a print job.

FIG. 10 is a sequence diagram illustrating an example of a process for registering the print job.

In step S20, the user operates the user terminal 10 and instructs the client application 19 to log in to the service providing system 50. The client application 19 may be an application for mobile device or a port monitor.

In step S21, the communication unit 15 of the client application 19 requests login by transmitting the user information to the authentication service 51. Based on a successful login, the client application 19 receives an authentication token. The user information is, for example, the tenant ID, the user ID, the password, and the like. The user ID may be an email address. Further, the login method may be a login linked with an external service.

In step S22, in response to a successful login by the authentication service 51, the display control unit 16 of the client application 19 displays a menu for various operations. In step S23, the user operates the user terminal 10 and instructs the client application 19 to submit the print job.

In step S24, the communication unit 15 of the client application 19 transmits the print job to the print job management service 52. The communication unit 55 of the print job management service 52 receives the print job and stores the print job in the print job storage unit 61. The print job management service 52 assigns a print job ID, stores the print job in the print job storage unit 61 in association with the tenant ID, user ID, file name, print job path, and print reservation (initial state is "FALSE").

Figure 11:
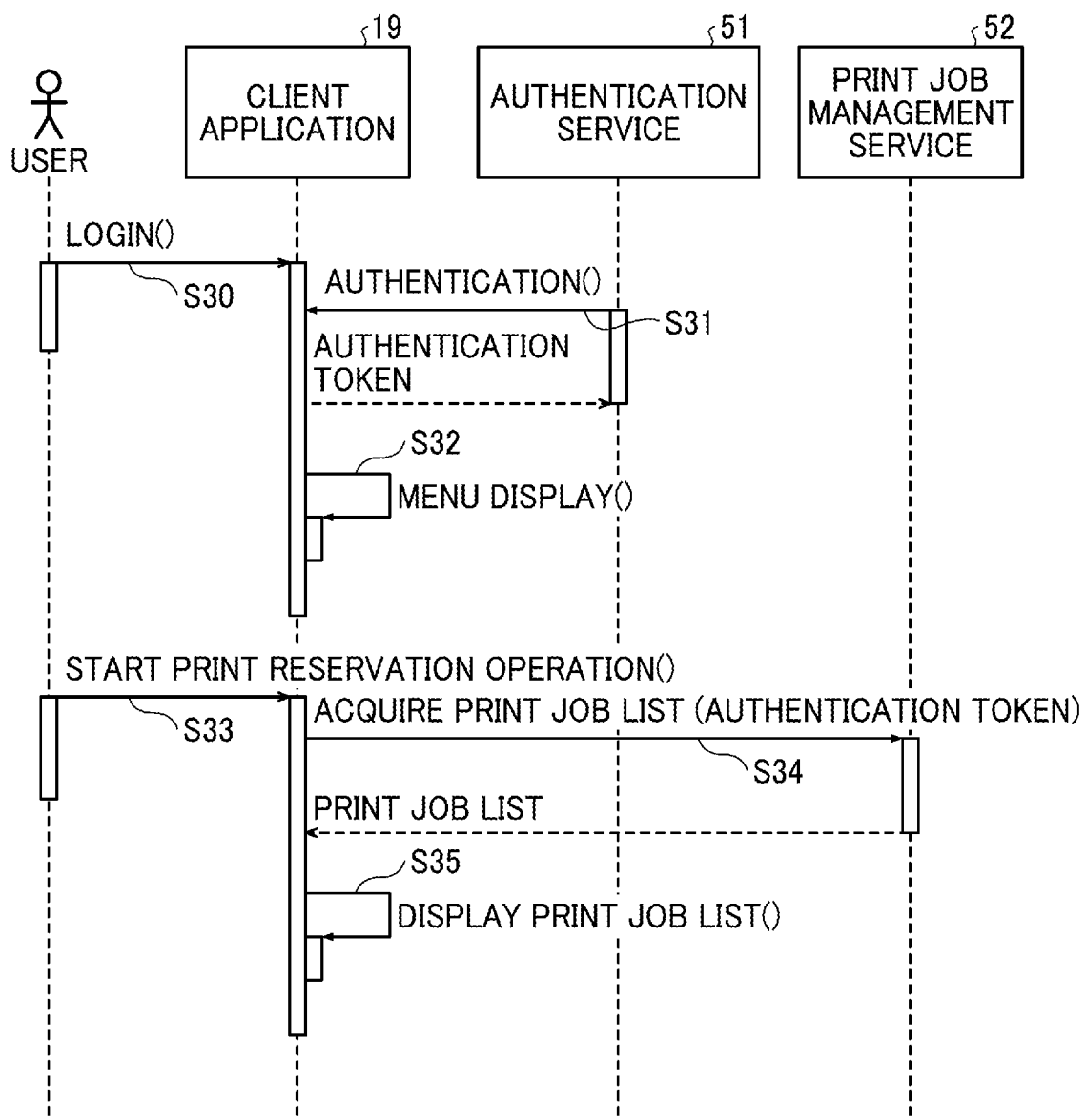
FIG. 11 is a sequence diagram illustrating an example of a process for reserving the print job.
Figure 12:
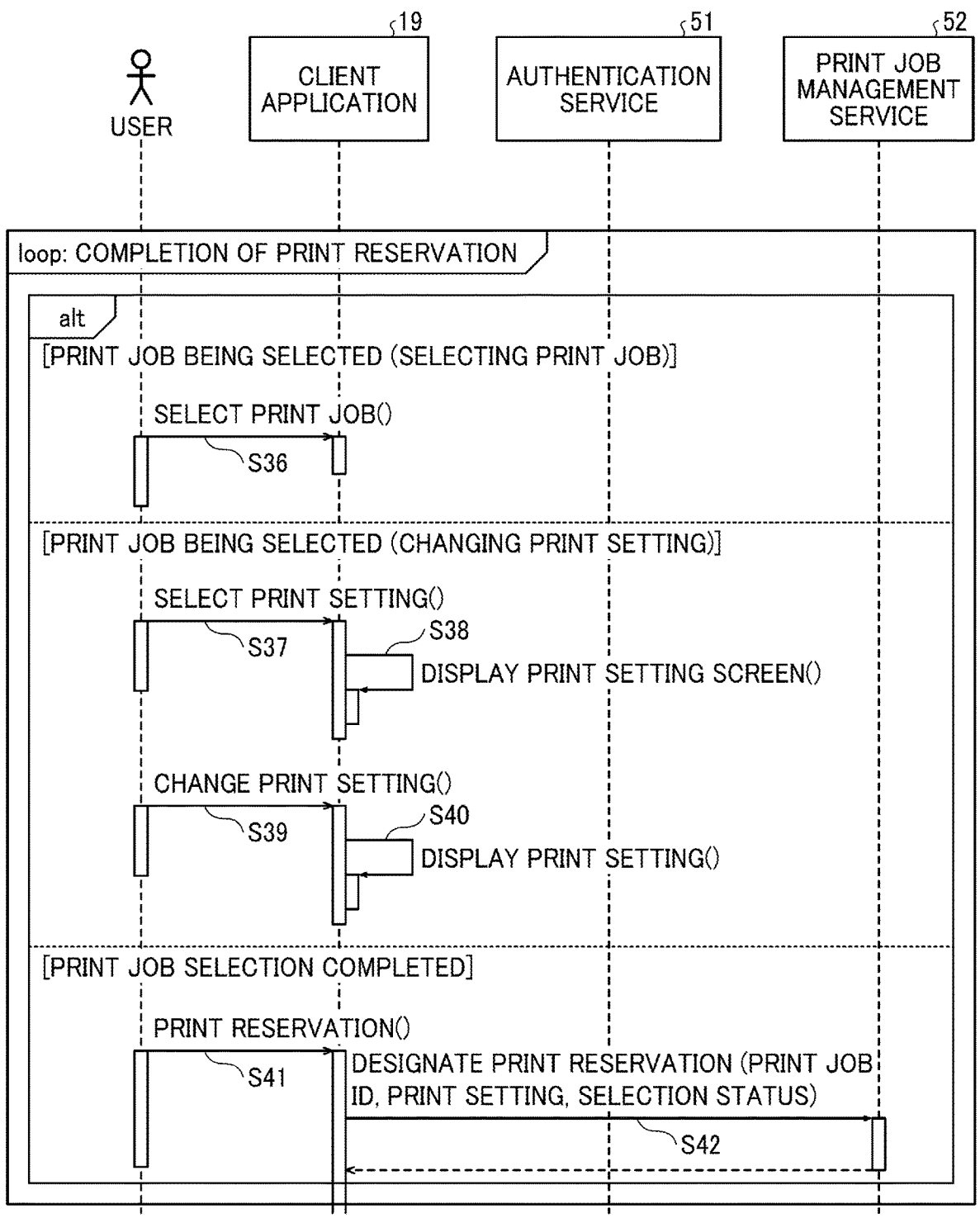
FIG. 12 is a sequence diagram illustrating another example of the process for reserving the print job.

FIGS. 11 and 12 are sequence diagrams illustrating an example of a process for making a print reservation. The user logs into the service providing system 50 in steps S30 to S32. The login method is the same as steps S20 to S22 in FIG. 10.

In step S33, the user instructs the client application 19 to start print reservation operation from the menu screen. In step S34, the communication unit 15 of the client application 19 requests the print job management service 52 to acquire a print job list associated with the user. At the time of request, the communication unit 15 uses the authentication token acquired by the client application 19 in step S31. The print job management service 52 acquires the print job list associated with the user ID specified by the authentication token.

In step S35, the communication unit 15 of the client application 19 receives the print job list. The display control unit 16 displays the print job list. In step S36, the user inputs selection of a print job to be reserved for printing to the client application 19. The operation reception unit 17 receives the selection. The user may select multiple print jobs.

In step S37, in the case the user wishes to change print settings, the user instructs the client application 19 to start changing the print settings of the print job. The operation reception unit 17 receives the start of changing the print settings. In step S38, the display control unit 16 of the client application 19 displays a print setting screen. In step S39, the user inputs change of the print settings to the client application 19. The operation reception unit 17 receives the change in the print settings. After changing the print settings, the display control unit 16 of the client application 19 displays the print job list again in step S40.

In step S41, the user selects a print job to be reserved for printing on the print job list screen. The operation reception unit 17 receives the print reservation. In step S42, the communication unit 15 of the client application 19 transmits the print job ID, print settings, and print job selection state to the print job management service 52 to designate the print reservation. The communication unit 55 of the print job management service 52 updates the print reservation of the print job for which the print reservation has been made to "TRUE" in the print job storage unit 61 according to the received print reservation.

Hereinafter, an example of automatic output that automatically prints a print job that has been reserved for printing and an example of manual output in which a print job manually selected by the user from a print job list is printed are described.

In the present embodiment, the print application 32 determines whether to execute the automatic output or manual output by using the automatic output parameter (isAutoPrint) and the print job list automatic download parameter (isBackendDownload). The automatic output parameter is an example of information indicating whether automatic output is to be made, and the print job list automatic download parameter is an example of information indicating whether automatic download of the print job list is to be made.

For the automatic output parameter "TRUE", the print application 32 selects the automatic output of the print job. For the automatic output parameter "FALSE", the print application 32 does not select the automatic output of the print job. The automatic output parameter is updated from "FALSE" to "TRUE", for example, when the print reservation is made for the print job.

The print job list automatic download parameter is used when the automatic output parameter is "FALSE". For the print job list automatic download parameter "TRUE", the print application 32 automatically downloads the print job list associated with the logged-in user in back end. For the print job list automatic download parameter "FALSE", the print application 32 is activated by the logged-in user and then downloads the print job list at the timing of displaying the print job list of the user. The print job list automatic download parameter may be set, for example, at a certain timing in the client application 19 or may be set immediately before the user terminal 10 is held over the output apparatus 30.

Figure 13:
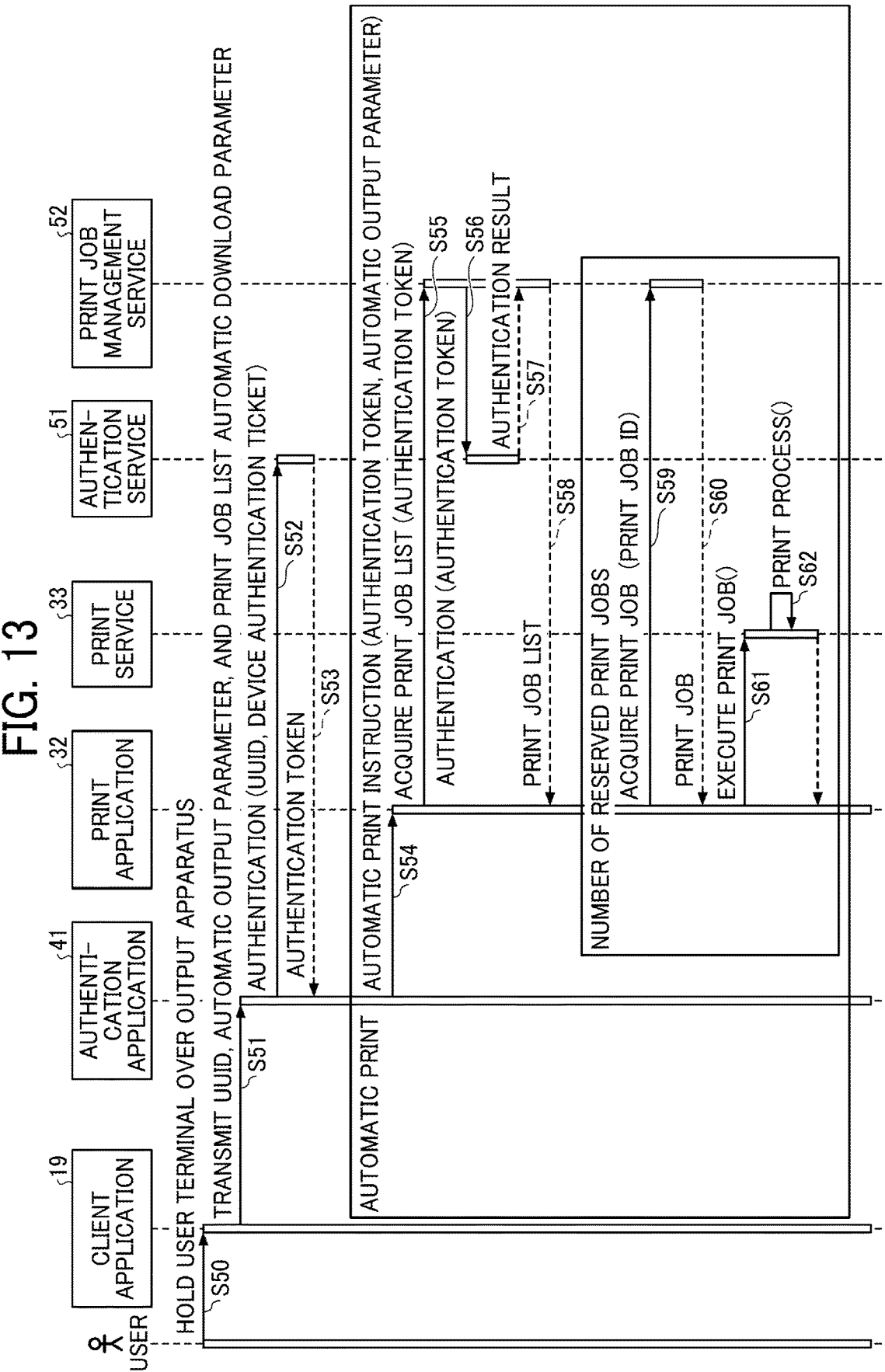
FIG. 13 is a sequence diagram illustrating an example of a process for automatically outputting the print job.

FIG. 13 is a sequence diagram illustrating an example of a process for automatically outputting the print job.

In step S50, the user activates the client application 19 of the user terminal 10 and holds the user terminal 10 over the output apparatus 30. For example, the user brings the user terminal 10 closer to the short-range wireless communication module 31 of the output apparatus 30.

The user terminal 10 connects to the output apparatus 30. In step S51, the client application 19 of the user terminal 10 transmits the UUID, the automatic output parameter, and the print job list automatic download parameter to the output apparatus 30. Here, the UUID, the automatic output parameter, and the print job list automatic download parameter are examples of information included in the setting information. The setting information is information related to the use of the output apparatus 30, and may include the information for activating the output apparatus 30, information for identifying the user of the output apparatus 30, and information for executing functions such as the print function of the output apparatus 30.

In step S52, the authentication application 41 of the output apparatus 30 transmits the UUID and the device authentication ticket to the authentication service 51 to request authentication. In response to a successful authentication based on the UUID and the device authentication ticket, the authentication service 51 identifies the user ID associated with the UUID in the account information storage unit 63. In step S53, the authentication service 51 returns the authentication token associated with the identified user ID to the output apparatus 30.

In response to receiving the authentication token, the authentication application 41 checks whether the automatic output parameter received in step S51 is "TRUE". In FIG. 13, the authentication application 41 confirms that the automatic output parameter is "TRUE".

In step S54, the authentication application 41 transmits an authentication token and the automatic output parameter to the print application 32, and instructs automatic printing. In step S55, the print application 32 transmits the authentication token to the print job management service 52 and requests acquisition of the print job list associated with the user.

In step S56, the print job management service 52 transmits the authentication token to the authentication service 51 to request authentication. In response to a successful authentication based on the authentication token, the authentication service 51 identifies the user ID associated with the authentication token in the user information storage unit 62. In step S57, the authentication service 51 returns the identified user ID to the print job management service 52.

In step S58, the print job management service 52 returns to the print application 32 the print job list with the print reservation "TRUE" among the print jobs associated with the identified user ID. The print application 32 receives the print job list including the print jobs with the print reservation set to "TRUE".

The processing of steps S59 to S62 is repeated for the number of print jobs (the number of print jobs reserved for printing) with the print reservation set to "TRUE". The print application 32 sequentially designates the print job IDs included in the print job list received in step S58, and executes printing.

In step S59, the print application 32 transmits the print job ID included in the print job list received in step S58 to the print job management service 52, and requests acquisition of the print job. In step S60, the print job management service 52 returns the print job associated with the print job ID to the print application 32. The print application 32 may collectively receive a plurality of print jobs.

In step S61, the print application 32 requests the print service 33 to execute the print job. In step S62, the print service 33 performs printing of the print job for which execution of the print job is requested. Note that the print reservation may be updated from "TRUE" to "FALSE" after the printing is completed. Further, a print job that has already been printed may be deleted.

In response to receiving the automatic output parameter "TRUE" from the user terminal 10, the output apparatus 30 may acquire and print the print job with print reservation set to "TRUE" from the print job management service 52 without waiting for an operation by the user. The user obtains printed matter printed by the output apparatus 30.

For example, the automatic output parameter may include identification information for identifying a print job to be automatically output, without being limited to the process illustrated in the sequence diagram of FIG. 13. In this case, the client application 19 transmits the print job to be automatically output to the output apparatus 30 at the timing of step S51. Based on the identification information of the print job, the output apparatus 30 automatically acquires the print job from the print job management service 52 and performs printing.

Further, when automatically outputting the print job, the output apparatus 30 may omit acquisition of the print job list. This is because the print job list is information used by the user to select a print job to be printed, and is not used when automatically outputting the print job.

Figure 14:
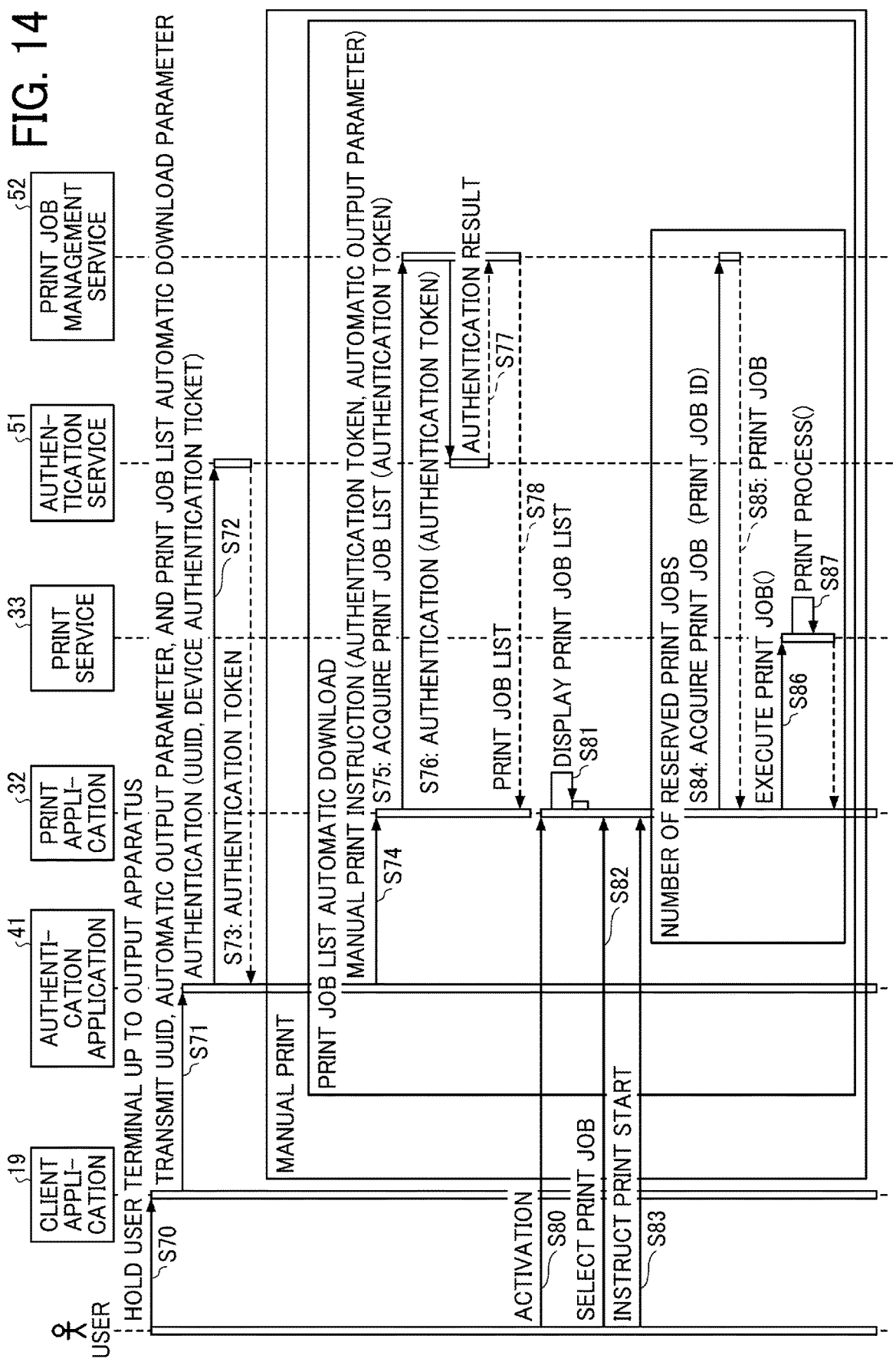
FIG. 14 is a sequence diagram illustrating another example of a process for manually outputting the print job.

FIG. 14 is a sequence diagram illustrating an example of a process for manually outputting the print job.

In step S70, the user activates the client application 19 of the user terminal 10 and holds the user terminal 10 over the output apparatus 30. For example, the user brings the user terminal 10 closer to the short-range wireless communication module 31 of the output apparatus 30.

The user terminal 10 connects to the output apparatus 30. In step S71, the client application 19 of the user terminal 10 transmits the UUID, the automatic output parameter, and the print job list automatic download parameter to the output apparatus 30.

In step S72, the authentication application 41 of the output apparatus 30 transmits the UUID and the device authentication ticket to the authentication service 51 to request authentication. In response to a successful authentication based on the UUID and the device authentication ticket, the authentication service 51 identifies the user ID associated with the UUID in the account information storage unit 63. In step S73, the authentication service 51 returns the authentication token associated with the identified user ID to the output apparatus 30.

In response to receiving the authentication token, the authentication application 41 checks whether the automatic output parameter received in step S71 is "TRUE". The authentication application 41 of FIG. 14 confirms that the automatic output parameter is "FALSE".

Based on the automatic output parameter "FALSE", the authentication application 41 transmits the authentication token and the print job list automatic download parameter "TRUE" to the print application 32 in step S74, and instructs manual printing.

In step S75, the print application 32 transmits the authentication token to the print job management service 52, and requests acquisition of a print job list associated with the user in backend processing.

In step S76, the print job management service 52 transmits the authentication token to the authentication service 51 to request authentication. In response to a successful authentication based on the authentication token, the authentication service 51 identifies the user ID associated with the authentication token in the user information storage unit 62. In step S77, the authentication service 51 returns the identified user ID to the print job management service 52.

In step S78, the print job management service 52 returns to the print application 32 the print job list associated with the identified user ID. The print application 32 receives the print job list associated with the user ID.

In step S80, the user operates the control panel of the output apparatus 30 to activate the print application 32. For example, a home screen including an icon of the print application 32 is displayed on the control panel of the output apparatus 30, and the print application 32 is activated by tapping the icon of the print application 32 or the like. In the case the print job list automatic download parameter is "TRUE", the print application 32 may be automatically started.

Figure 15:
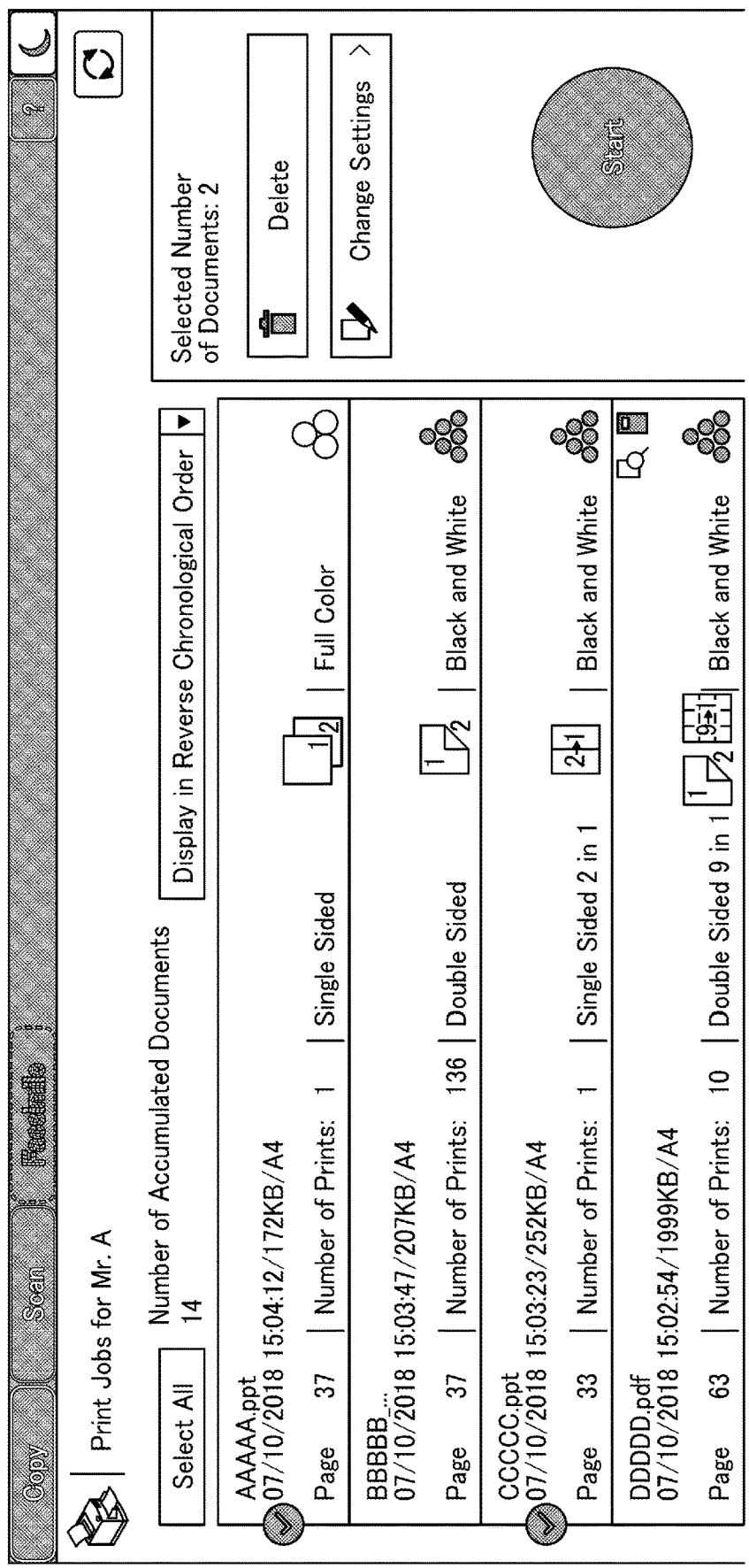
FIG. 15 is a diagram illustrating an example of a screen a print application that has been started.

FIG. 15 is a screen image of an example of the activated print application. The print application 32 displays, for example, a screen as illustrated in FIG. 15 on the control panel of the output apparatus 30, and receives various operations from the user.

In step S81, the print application 32 displays the print job list received in step S78, for example, as illustrated in FIG. 15. In the present embodiment, since the print job list is acquired before the user operates the control panel of the output apparatus 30 to activate the print application 32 in step S80, the display of the print job list is speeded up.

Note that when the automatic output parameter and the print job list automatic download parameter are "FALSE", the authentication application 41 transmits the authentication token and the print job list automatic download parameter "FALSE" to the print application 32, and issues a manual print instruction in step S74. However, the processing of steps S75 to S78 is performed after the print application 32 is activated in step S80.

In the present embodiment, the processing of steps S75 to S78 is performed after the print application 32 is activated in step S80. For example, when the user logs in by holding the user terminal 10 over the output apparatus 30 for the purpose of processing other than printing, unnecessary acquisition of the print job list can be prevented and a load on communication can be reduced.

In step S82, a print job to be printed is selected from the print job list illustrated in FIG. 15, for example, on the print application 32. The print job selected by the user changes so as to be visually distinguished in the print job list of FIG. 15. For example, in FIG. 15, a check mark is added to the selected print job. After selecting the print job to be printed from the print job list of FIG. 15, in response to the pressing of a start button by the user on the screen of FIG. 15, the output apparatus 30 performs the processes of steps S84 to S87.

The processing of steps S84 to S87 is repeated by the number of print jobs selected by the user in step S83. The print application 32 sequentially designates the print job IDs of the print jobs selected from the print job list in step S83, and executes printing.

In step S84, the print application 32 transmits the print job ID of the print job selected by the user from the print job list to the print job management service 52, and requests acquisition of the print job. In step S85, the print job management service 52 returns the print job associated with the print job ID to the print application 32. The print application 32 may collectively receive a plurality of print jobs.

In step S86, the print application 32 requests the print service 33 to execute the print job. In step S87, the print service 33 performs printing of the print job for which execution of the print job is requested. A print job that has already been printed may be deleted.

In response to receiving the automatic output parameter "FALSE" from the user terminal 10, the output apparatus 30 acquires the print job list associated with the user from the print job management service 52 and prints a print job selected by the user from the print job list. The user obtains printed matter printed by the output apparatus 30.

Further, the output apparatus 30 of the present embodiment may be manually logged in by the user without using the user terminal 10. In the case the user manually logs in, the output apparatus 30 does not receive the automatic output parameter and the print job list automatic download parameter, and does not execute the processing illustrated in FIG. 12 or 13.

In the automatic output that automatically prints the print job reserved for printing, in response to the user holding up a smart device that is an example of the user terminal 10, and logs in to an MFP, which is an example of the output apparatus 30, the print job is automatically executed. Accordingly, the user can omit the operation of activating the print application 32 and the operation of selecting the print job on the MFP. In the case the automatic output parameter is set to "TRUE", the MFP may not be notified of the print job list automatic download parameter. As a result, the communication is simplified.

For example, a cloud service stores a plurality of print jobs accumulated by users. By using the client application 19 to designate a print reservation for some print jobs out of a plurality of print jobs, the user is able to automatically output the print jobs that are reserved.

In addition, after performing the automatic output of some of the print jobs that have been reserved for printing, the user may want to print the rest of the print jobs, excluding the print jobs that are printed. In this case, the print job list automatic download parameter is notified to the output apparatus 30 in order to manually output the remaining print jobs.

The output apparatus 30 automatically downloads the print job list when the print job list automatic download parameter is "TRUE". As a result, the user can select a desired print job from among the remaining print jobs from the print job list and manually output the selected print job.

In the manual output in which a print job manually selected by the user from the print job list is printed, the user either holds up the smart device that is an example of the user terminal 10, or manually logs in to the MFP that is an example of the output apparatus 30. After logging into the MFP, the user manually selects a print job to be printed from the displayed print job list.

For a login to the MFP by holding up the smart device, the MFP is notified of the automatic output parameter "FALSE" or without the parameter from the client application 19, the print job is not automatically printed.

In the case the print job list automatic download parameter is "FALSE", or the parameter is not set, the print application 32 does not automatically download the print job list. On the other hand, in the case the print job list automatic download parameter is "TRUE", the print job list is acquired from the print job management service 52 in order to display the print job list instantly after the print application 32 is started.

For a manual login (the smart device is not used, and login information is manually entered on the control panel), since the MFP does not receive the automatic output parameter and the print job list automatic download parameter, neither automatic output nor automatic download of the print job list is performed.

In response to the user tapping the icon of the print application 32 to activate the print application 32 after logging in to the MFP, the print job list that has already been acquired is displayed in the case the print job list automatic download parameter is "TRUE". On the other hand, when the print job list automatic download parameter is "FALSE", the print job list associated with the user is acquired and displayed at the timing when the print application 32 is activated. With the print job list displayed, the user selects a print job to be printed and presses the start button. The print application 32 of the MFP acquires the print job selected by the user from the print job management service 52 and causes the print service 33 to execute the printing.

According to the present embodiment, in the output apparatus 30, the automatic output for automatically printing a print job reserved for printing, and the manual output for printing a print job manually selected by the user from a print job list, are implemented by the common print application 32. Based on the parameter received from the user terminal 10, the print application 32 determines the automatic output for automatically printing a print job for which print reservation has been specified, and the manual output for printing a print job manually selected by the user from the print job list.

The automatic output parameter and the print job list automatic download parameter are examples of parameters that the print application 32 receives from the user terminal 10. Further, the UUID, the automatic output parameter, and the print job list automatic download parameter that the print application 32 receives from the user terminal 10 are examples of information to start the use of the output apparatus 30.

In the output apparatus 30, the common print application 32 performs the automatic output for automatically printing a print job for which print reservation has been designated, and the manual output for printing a print job manually selected by a user from a print job list are implemented, and the development and management man-hours on the vendor can be reduced. Further, in the output apparatus 30, the common print application 32 performs the automatic output for automatically printing a print job that has been reserved for printing, and the manual output for printing a print job that is manually selected by the user from a print job list, the installation operation on the user side can be reduced.

Although the best mode for carrying out the present disclosure has been described using the examples described above, the present disclosure is not limited to these examples, and various modifications and substitutions can be made without departing from the scope of the present disclosure.

In the present embodiment, the image forming apparatus, which is an example of the output apparatus 30, is used for explanation, but the present disclosure is not limited to the image forming apparatus. The output apparatus 30 includes, for example, an output apparatus such as a projector (PJ), an interactive white board (a whiteboard having an electronic blackboard function capable of mutual communication (IWB)), a digital signage, a head up display (HUD) device, and an industrial machine, an imaging device, a sound collecting device, a medical device, a network home appliance, an automobile (connected car), a notebook PC, a mobile phone, a smartphone, a tablet terminal, a game console, a personal digital assistant (PDA), a digital camera, a wearable PC or a desktop PC.

Further, in the example of functional configuration illustrated in FIG. 7, main functions are divided in order to facilitate understanding of processing by the user terminal 10, the service providing system 50, and the output apparatus 30. The present disclosure is not limited by the method of dividing the processing units illustrated in FIG. 7 and the names thereof.

The processing of the user terminal 10, the service providing system 50, and the output apparatus 30 can also be divided into more processing units according to the content of the processing. Further, one process may be divided to include a larger number of processes.

The apparatuses or devices described in the present embodiment are merely one example of plural computing environments that implement one or more embodiments disclosed herein. In some embodiments, the information processing system 1 may be configured to include multiple computing devices such as a server cluster. The multiple computing devices are configured to communicate with one another through any type of communication link, including a network, shared memory, etc., and perform the processes disclosed herein.

Further, the information processing system 1 can be configured to share the disclosed processing steps, for example, FIGS. 10 to 14, in various combinations. For example, a process executed by a given unit can be executed by a plurality of information processing apparatuses included in the information processing system 1. The information processing system 1 may be integrated into one device, or may be divided into a plurality of devices.

Aspects of the present disclosure are, for example, as follows.

According to a first aspect, an output apparatus outputs the electronic data received from a service providing system, the output apparatus including an information reception unit for receiving setting information related to a use of the output apparatus from a user terminal of a user, and an output control unit for controlling based on the setting information, whether to output the electronic data received from the service providing system, or to receive list information of the electronic data from the service providing system and output the electronic data selected from the list information by the user.

According to a second aspect, in the output apparatus of the first aspect, the output control unit controls based on the information related to automatic output included in the setting information, whether to output the electronic data received from the service providing system, or to receive list information of the electronic data from the service providing system and output the electronic data selected from the list information by the user.

According to a third aspect, in the output apparatus of the first aspect or the second aspect, in a case of outputting the electronic data received from the service providing system based on the information included in the setting information related to an automatic output, the output control unit controls to automatically output electronic data reserved for output among the electronic data.

According to a fourth aspect, in the output apparatus of any one of the first aspect to the third aspect, the output control unit controls whether to receive the list information of the electronic data by automatic download based on information included in the setting information related to the automatic download.

According to a fifth aspect, in the output apparatus of any one of the first aspect to the fourth aspect, in a case the automatic download of the list information of the electronic data is not received, the output control unit controls to receive the list information of the electronic data after the output application installed in the output apparatus is activated.

According to a sixth aspect, in the output apparatus of any one of the first aspect to the fifth aspect, the information reception unit receives information to start the use of the output apparatus from the user terminal by short-range wireless communication.

According to a seventh aspect, in the output apparatus of any one of the first aspect to the sixth aspect, the information reception unit receives information to start the use of the output apparatus from a recording medium of the user.

According to an eighth aspect, in the output apparatus of any one of the first to seventh aspect, the electronic data is a print job.

According to a ninth aspect, an output method performed by an output apparatus that outputs electronic data received from a service providing system, the output method includes an information reception step in which the output apparatus receives setting information related to use of the output apparatus from a user terminal of a user, and an output control step in which the output apparatus controls based on the setting information, whether to output the electronic data received from the service providing system, or to receive list information of the electronic data from the service providing system and output the electronic data selected from the list information by the user.

According to a tenth aspect, a program to cause an output apparatus for outputting electronic data received from a service providing system to perform an output control method including an information reception step in which the output apparatus receives setting information related to use of the output apparatus from a user terminal of a user, and an output control step in which the output apparatus controls, based on the setting information, whether to output the electronic data received from the service providing system, or to receive list information of the electronic data from the service providing system and output the electronic data selected from the list information by the user.

According to an eleventh aspect, in an information processing system including a user terminal operated by a user, a service providing system for storing electronic data, and an output apparatus for outputting the electronic data received from the service providing system, the user terminal includes an information transmission unit for transmitting information to start use of the output apparatus, and the output apparatus includes an information reception unit for receiving setting information related to the use of the output apparatus from the user terminal, and an output control unit for controlling, based on the setting information, whether to receive and output the electronic data from the service providing system, or to receive list information of the electronic data from the service providing system and output the electronic data selected from the list information by the user.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing system comprising:
   a service providing system storing electronic data;
   a user terminal operated by a user; and
   an output apparatus including circuitry configured to:
      receive setting information related to use of the output apparatus from the user terminal operated by the user; and
      control based on the setting information, whether to output reserved electronic data received from the service providing system, the reserved electronic data is reserved by the user terminal, or to receive list information indicating a list of electronic data from the service providing system and output the electronic data selected from the list information by the user;
   wherein the user terminal includes another circuitry configured to:
      transmit, to the output apparatus, information used for starting of use of the output apparatus;
      receive, from the list of the electronic data, a selection of first electronic data as the reserved electronic data;
      receive a selection of one electronic data as the reserved electronic data from the list;
      set the setting information to cause the output apparatus to output the reserved electronic data received from the service providing system in case that the selection is received; and
      set the setting information to cause the output apparatus to receive the list information indicating the list of electronic data from the service providing system and output the electronic data selected from the list information by the user in case that the selection is not received.

2. The information processing system of claim 1, wherein the circuitry is configured to control based on information related to automatic output included in the setting information, whether to output the reserved electronic data received from the service providing system, or to receive the list information indicating the list of the electronic data from the service providing system and output the electronic data selected from the list information by the user.

3. The information processing system of claim 1, wherein in response to receiving the reserved electronic data or the electronic data to be output from the service providing system based on the information related to the automatic output included in the setting information, the circuitry is configured to control to automatically output electronic data reserved for output.

4. The information processing system of claim 1, wherein the circuitry is configured to control whether to receive the list information of the electronic data by automatic download based on the information related to the automatic download included in the setting information.

5. The information processing system of claim 4, wherein in a case the list information indicating the list of the electronic data is not received by the automatic download, the circuitry is further configured to control to receive the list information indicating the list of the electronic data after an output application installed in the output apparatus is activated.

6. The information processing system of claim 1, wherein the circuitry is further configured to receive information used for starting of use of the output apparatus from the user terminal by short-range wireless communication.

7. The information processing system of claim 1, wherein the circuitry is further configured to receive information used for starting of the use of the output apparatus from a recording medium of the user.

8. The information processing system of claim 1, wherein the electronic data is a print job and the reserved electronic data is a print job.

9. An output method performed by an output apparatus, a service providing system storing electronic data, and a user terminal operated by a user, the method comprising:
   receiving, by the output apparatus, setting information related to use of the output apparatus from the user terminal operated by the user;
   controlling, by the output apparatus, based on the setting information, whether to output reserved electronic data received from the service providing system, the reserved electronic data is reserved by the user terminal, or to receive list information indicating a list of electronic data from the service providing system and output the electronic data selected from the list information by the user;
   transmitting, by the user terminal, to the output apparatus, information used for starting of use of the output apparatus;
   receiving, by the user terminal, from the list of the electronic data, a selection of first electronic data as the reserved electronic data;
   receiving, by the user terminal, a selection of one electronic data as the reserved electronic data from the list;
   setting, by the user terminal, the setting information to cause the output apparatus to output the reserved electronic data received from the service providing system in case that the selection is received; and
   setting, by the user terminal, the setting information to cause the output apparatus to receive the list information indicating the list of electronic data from the service providing system and output the electronic data selected from the list information by the user in case that the selection is not received.

10. A non-transitory recording medium storing a plurality of instructions which, when executed by one or more processors of an information processing system including a service providing system storing electronic data, a user terminal operated by a user, and an output apparatus, causes the processors to perform an output method, comprising:
   receiving, by the output apparatus, setting information related to use of an output apparatus from the user terminal operated by the user;
   controlling, by the output apparatus, based on the setting information, whether to output reserved electronic data received from the service providing system, the reserved electronic data is reserved by the user terminal, or to receive list information indicating a list of electronic data from the service providing system and output the electronic data selected from the list information by the user;
   transmitting, by the user terminal, to the output apparatus, information used for starting of use of the output apparatus;
   receiving, by the user terminal, from the list of the electronic data, a selection of first electronic data as the reserved electronic data;
   receiving, by the user terminal, a selection of one electronic data as the reserved electronic data from the list;
   setting, by the user terminal, the setting information to cause the output apparatus to output the reserved electronic data received from the service providing system in case that the selection is received; and
   setting, by the user terminal, the setting information to cause the output apparatus to receive the list information indicating the list of electronic data from the service providing system and output the electronic data selected from the list information by the user in case that the selection is not received.

* * * * *